United States Patent
Kanda et al.

[11] Patent Number: 6,163,390
[45] Date of Patent: Dec. 19, 2000

[54] METHOD FOR PRODUCING A HOLOGRAM AND A DISPLAY DEVICE USING THE SAME

[75] Inventors: Tomoyuki Kanda, Inabe-gun; Kazutoshi Koie, Tokoname; Katsuyoshi Nishii; Masahiro Shiozawa, both of Kariya; Katsumi Kamiya, Toyota; Atsuo Ishizuka, Nagoya; Kenichiro Takada, Yokkaichi, all of Japan

[73] Assignees: Denso Corporation, Kariya; Nippon Soken, Inc., Nishio, both of Japan

[21] Appl. No.: 09/516,562

[22] Filed: Feb. 29, 2000

Related U.S. Application Data

[63] Continuation of application No. 08/741,175, Oct. 29, 1996.

[30] Foreign Application Priority Data

| Oct. 30, 1995 | [JP] | Japan | 7-282209 |
| Nov. 6, 1995 | [JP] | Japan | 7-287419 |
| Dec. 14, 1995 | [JP] | Japan | 7-347953 |
| Jan. 22, 1996 | [JP] | Japan | 8-28616 |

[51] Int. Cl.⁷ .................................................. G03H 1/02
[52] U.S. Cl. ................................................ 359/28; 359/1
[58] Field of Search ................................ 359/1, 15, 28

[56] References Cited

U.S. PATENT DOCUMENTS

| 3,511,554 | 5/1970 | Osterberg et al. |
| 3,888,561 | 6/1975 | Kurtz ................................. 359/28 |
| 4,343,874 | 8/1982 | Haines |
| 4,981,332 | 1/1991 | Smith |
| 5,296,948 | 3/1994 | Chen et al. |
| 5,600,454 | 2/1997 | Trayner et al. |
| 5,745,257 | 4/1998 | Hart |

FOREIGN PATENT DOCUMENTS

| 0087281 | 8/1983 | European Pat. Off. |
| 463888 | 1/1992 | European Pat. Off. |
| 536763 | 4/1993 | European Pat. Off. |
| 1931259 | 1/1970 | Germany |
| 50-57457 | 5/1975 | Japan |
| 2-89080 | 3/1990 | Japan |
| 4-298710 | 10/1992 | Japan |
| 5-203812 | 8/1993 | Japan |
| 5-330362 | 12/1993 | Japan |
| 7-172213 | 7/1995 | Japan |
| 92/09915 | 6/1992 | WIPO |
| 94/12913 | 6/1994 | WIPO |

*Primary Examiner*—Darren Schuberg
*Attorney, Agent, or Firm*—Pillsbury Madison & Sutro LLP

[57] ABSTRACT

A method for producing a hologram recording an interference fringe formed by an object light and a reference light on a photosensitive dry plate, and the object light either having diffusing and scattering characteristics or being passed through an optical diffusion body, mainly includes the following steps: In a first step, a ratio $\eta_{RO}/\eta_{OO}$ of a first diffraction efficiency $\eta_{OO}$ and a second diffraction efficiency $\eta_{RO}$, is calculated. The diffraction efficiency $\eta_{OO}$ is dependent on two object light beams. The efficiency $\eta_{RO}$ is dependent on the object light and the reference light. In a second step, the intensity $E_O$ of the object light and the intensity $E_R$ of the reference light is adjusted in such a way that the ratio $\eta_{RO}/\eta_{OO}$ is set to at least 10 and the efficiency $\eta_{OO}$ does not exceed 5%.

A display device using the above hologram is structured by a display unit for generating a signal light; a hologram screen formed by either reflection or transmission hologram, and a projecting unit for projecting the signal light to the hologram screen.

According to the present invention, it is possible to easily produce a hologram, for example, a screen hologram, having no cloudiness or cloudy state when an observer observes an image displayed on the screen, and to a display device using the above hologram screen.

3 Claims, 26 Drawing Sheets

SCREEN HOLOGRAM

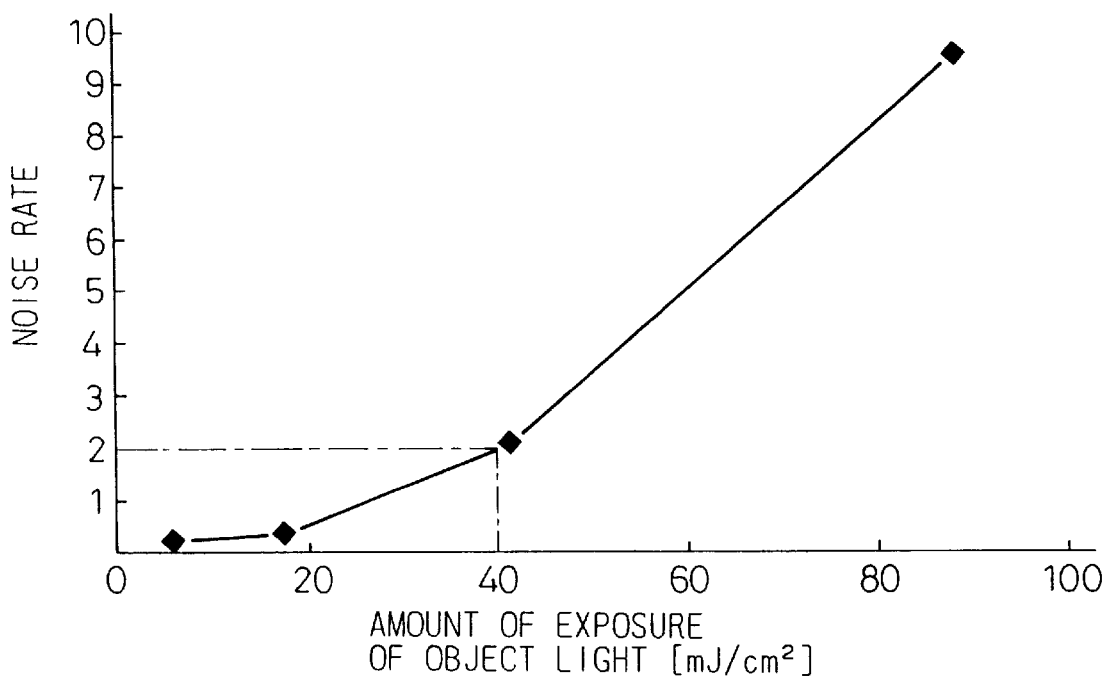
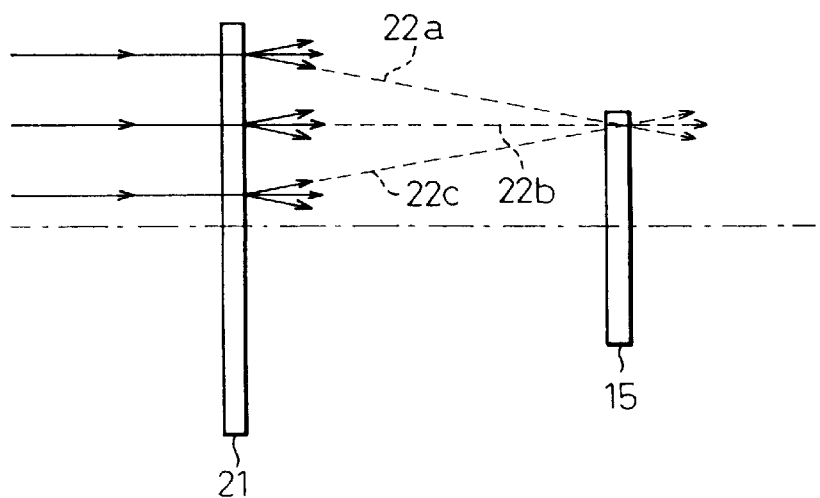

METHOD FOR PRODUCING A HOLOGRAM AND A DISPLAY DEVICE USING THE SAME

This is a continuation of application Ser. No. 08/741,175, filed Oct. 29, 1996.

BACKGROUND OF THE INVENTION

1. Field of the Invention

The present invention relates to a method for producing a hologram and a display device using the same. Particularly, it relates to a method for producing a screen hologram, and to a display device using the screen hologram.

2. Description of the Related Art

There is a known screen hologram which displays an image, which is output from a display unit, on a transparent screen which is made of the hologram, and an observer observes the image on the screen hologram by looking through from a rear side (background) of the screen.

As one example of use of the screen hologram, it is provided as a window of a bank or hospital so that it is possible to easily observe and meet with a customer or patient through the window. In this case, as the contents of the image, two kinds of images can be displayed, i.e., one is the image necessary for the customer or patient, and the other is the image necessary for an officer of the bank or hospital. Further, as another example of use, the screen hologram is provided as an advertising means in a showroom of a department store or shopping center in order to obtain a desirable advertising effect.

As mentioned above, since the screen hologram is widely utilized in various fields, the present invention aims to improve visibility of the hologram, particularly, the screen hologram when the observer observes the image displayed.

SUMMARY OF THE INVENTION

The primary object of the present invention is to provide a method for easily producing a hologram, for example, a screen hologram, having no cloudiness or cloudy state when an observer observes an image displayed on the screen.

The another object of the present invention is to provide a display device using the above hologram screen.

In accordance with one aspect of the present invention, there is provided a method for producing a hologram recording an interference fringe formed by an object light and a reference light on a photosensitive dry plate, and the object light either having diffusing and scattering characteristics or being passed through an optical diffusion body, including the steps of:

calculating a ratio $\eta_{RO}/\eta_{OO}$ of a first diffraction efficiency $\eta_{OO}$ and a second diffraction efficiency $\eta_{RO}$, the first diffraction efficiency $\eta_{OO}$ being obtained by the interference fringe formed by two object lights, and the second diffraction efficiency $\eta_{RO}$ being obtained by the interference fringe formed by the object light and the reference light; and adjusting an intensity $E_O$ of the object light and the intensity $E_R$ of the reference light in such a way that the ratio $\eta_{RO}/\eta_{OO}$ is set to at least 10 and the first diffraction efficiency $\eta_{OO}$ does not exceed 5%.

In a preferred embodiment, the intensity of the object light is set out of the sensitive area of the photosensitive dry plate.

In another preferred embodiment, the intensity of the object light is set to the extent that the first diffraction efficiency $\eta_{OO}$ obtained by the interference fringe formed by two object lights does not exceed 2%.

In still another embodiment, a ratio $n_O/n_R$ of a magnification $n_R$ of a lens for diverging the reference light and the magnification $n_O$ of a lens for diverging the object light is set to 4 or more.

In still another embodiment, the optical diffusion body and the photosensitive dry plate are arranged apart each other more than a predetermined distance.

In still another embodiment, an attenuation material for an optical intensity is arranged in the light path of the object light.

In still another embodiment, a ratio $E_R/E_O$ of the intensity $E_O$ of the object light and the intensity $E_R$ of the reference light is set to 5 or more.

In accordance with another aspect of the present invention, there is provided a method for producing a hologram recording an interference fringe formed by an object light (or which passes through an optical diffusion body) and a reference light on a photosensitive dry plate, including the steps of:

arranging a half transmission mirror close to the photosensitive dry plate so that the object light is reflected by the half transmission mirror and the reflected object light is irradiated onto the photosensitive dry plate;

arranging an optical diverging body close to a rear side of the half transmission mirror so that the reference light is transmitted through the optical diverging body and the half transmission mirror; and obtaining the hologram recording the interference fringe formed by the object light and the reference light on the photosensitive dry plate.

In a preferred embodiment, an angle of the half-transmission mirror is changeable so that a plurality of interference fringes are recorded on the photosensitive dry plate by changing the angle for irradiating the object light onto the photosensitive dry plate.

In another preferred embodiment, the half-transmission mirror has two reflection surfaces each having a different reflection angle for the object light so that a plurality of interference fringes are simultaneously recorded on the photosensitive dry plate.

In still another preferred embodiment, a plurality of interference fringes are simultaneously recorded on the photosensitive dry plate by using a plurality of object lights each having a different irradiation angle and being formed by irradiating lights from different directions onto the optical diffusion body.

In accordance with still another aspect of the present invention, there is provided a display device using a hologram recording an interference fringe formed by an object light and a reference light on a photosensitive dry plate, including:

a display unit for generating a signal light including an image to be displayed;

a hologram screen formed by either a transmission or a reflection hologram and having directivity in order to diffract and transmit the signal light irradiated from a predetermined angle range α to an observer; and a projecting unit for projecting the signal light onto the hologram screen;

wherein a reflection preventing material (having transparency in the transmission hologram) is arranged at a rear side of the hologram screen, and has a low reflection rate for an incident angle of a first noise light or a second noise light; the first noise light is generated from a direction opposite to the predetermined angle range α to the hologram screen, and diffracted therefrom and transmitted therethrough; and the second noise light is normally reflected by the reflection preventing material, and has the same direction as the predetermined angle range α.

In accordance with still another preferred embodiment, there is provided a display device using a hologram recording an interference fringe formed by an object light and a reference light on a photosensitive dry plate, including:

a display unit for generating a signal light including an image to be displayed;

a hologram screen formed by either a reflection or a transmission hologram, having a high diffraction efficiency for a light linearly polarized to a predetermined direction, and having directivity in order to diffract the signal light irradiated from a predetermined angle range to an observer; and a projecting unit for projecting the signal light onto the hologram screen;

wherein a polarization optical element is arranged at a front side of the hologram screen so that the hologram screen selectively transmits the linearly polarized light having the high diffraction efficiency by passing it through the polarization optical element.

In a preferred embodiment, the hologram screen has a high diffraction efficiency for the light linearly polarized to a predetermined direction, and the polarization optical element is arranged at a front of the hologram screen.

In another preferred embodiment, a light absorbing material is arranged around the hologram screen so as not to obstruct a light path of a normalized light which is irradiated onto and output from the hologram screen.

In still another preferred embodiment, the hologram screen is the transmission type, and the projecting unit has a reflecting optical element in order to project the signal light from a slanting upper direction or a slanting lower direction of the hologram screen, and all structural elements of the display device are contained within a box having the same dimensions as that of the hologram screen.

In still another preferred embodiment, the display unit has a liquid crystal device and a light source for irradiating the light from a predetermined direction to the liquid crystal device.

In accordance with still another preferred embodiment, there is provided a display device using a hologram and taking a picture of an observer who observes a display screen, including:

a display unit generating a signal light including an image to be displayed;

a transmission or reflection hologram screen including a diffusion board;

an image optical system for forming the image of the signal light on the hologram screen;

a camera viewing the observer from the rear side of the hologram screen, and taking the picture of the observer.

In a preferred embodiment, a line connecting a center portion of the camera and an eye of the observer approximately corresponds to a line connecting a center of an image forming portion on the hologram screen and an eye of the observer.

BRIEF DESCRIPTION OF THE DRAWING

In the drawings:

FIG. 9 is a graph for explaining a relationship between an amount of exposure by the object light and the noise rate;

FIG. 10 shows an essential structure of the optical system for producing the screen hologram;

DESCRIPTION OF THE PREFERRED EMBODIMENTS

Figure 26:
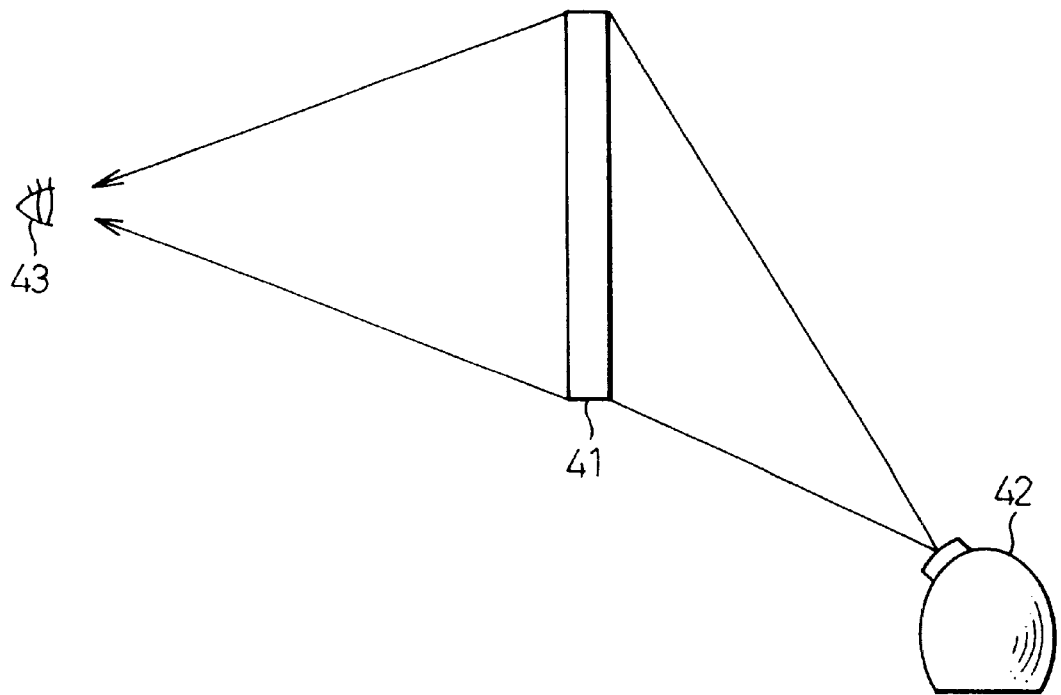
FIG. 26 shows a display device using a transmission hologram.

FIG. 26 shows a basic structure of a display device using a transmission-type screen hologram. In the drawing, reference number 41 denotes a screen hologram, 42 a projector, and 43 an observer. The projector 42 is arranged to the rear side of the screen hologram 41, and an image to be displayed is projected by the projector 42 to the screen hologram 41. The image projected on the screen hologram 41 is observed by the observer 43.

Figure 27:
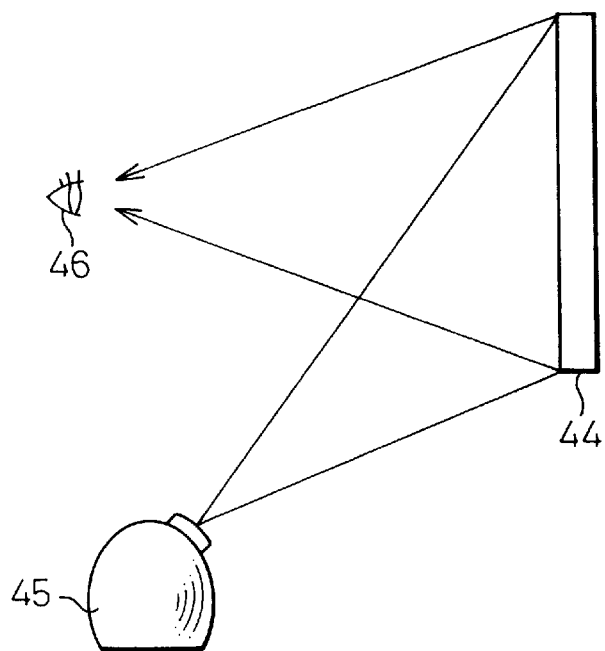
FIG. 27 shows a display device using a reflection hologram.

FIG. 27 shows a basic structure of a display device using a reflection type screen hologram. The projector 45 is arranged to the front side of the screen hologram 44, and the image to be displayed is projected by the projector 45 to the screen hologram 44. The image projected on the screen hologram 44 is observed by the observer 46.

Figure 28:
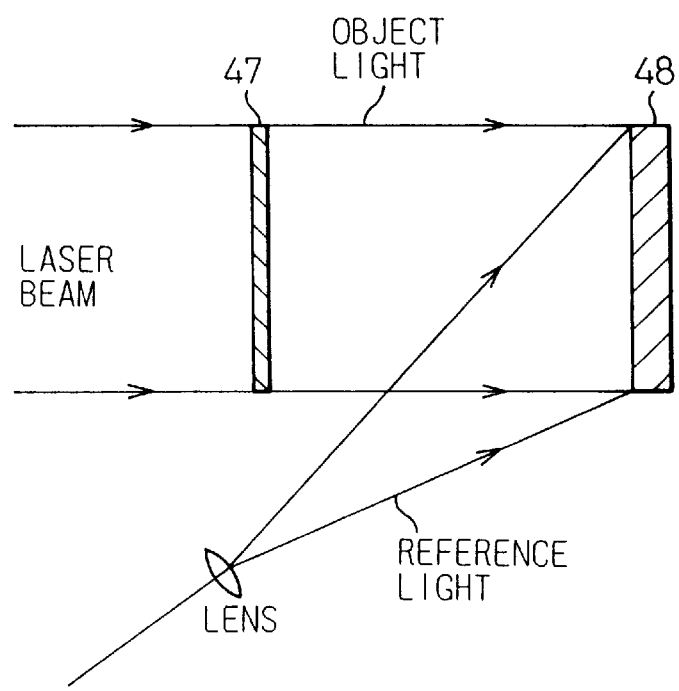
FIG. 28 shows an exposure optical system for producing the transmission screen hologram.
Figure 29:
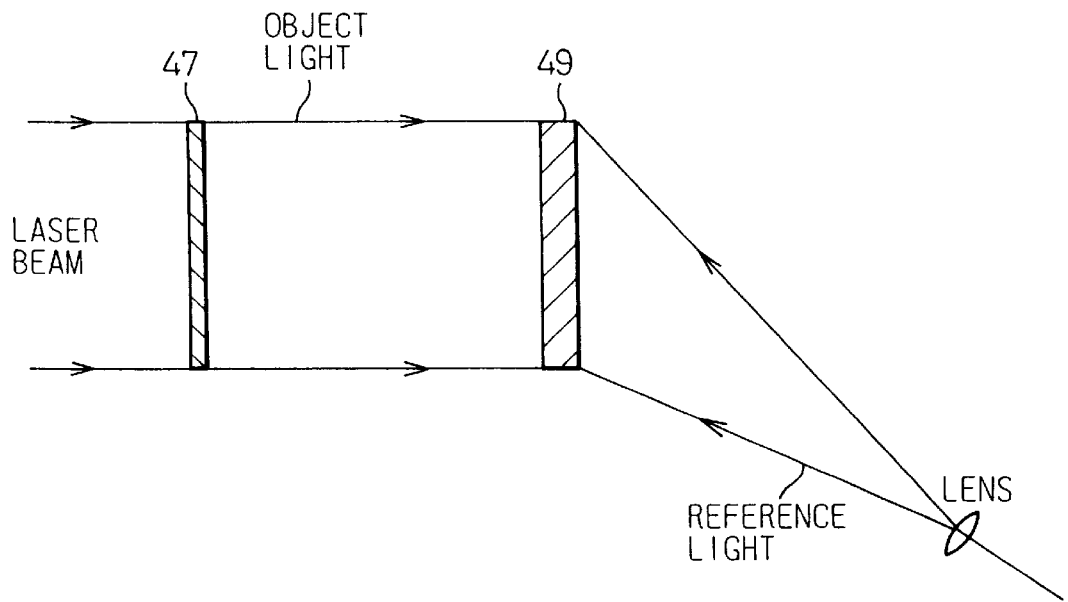
FIG. 29 shows an exposure optical system for producing the reflection screen hologram.

FIGS. 28 and 29 are explanatory views for explaining a method for producing the screen hologram. In these drawings, FIG. 28 shows a transmission hologram, and FIG. 29 shows a reflection hologram. A known method for producing the screen hologram is explained below. That is, a laser beam is diffused through a diffusion body 47, for example, a frosted glass, in order to make a diffusion light which is used as an object light. On the other hand, a reference light is projected to a photosensitive dry plate 48 and 49 through a lens. In this case, an interference fringe is formed by the object light and the reference light on the photosensitive dry plate 48 and 49.

In FIG. 28, the reference light is irradiated from the same side as the object light so that, after the hologram is produced, the observer can observe the image from the opposite side of the reference light (this is also called a "transmission hologram"). In FIG. 29, the reference light is irradiated from the opposite side to the object light so that, after the hologram is produced, the observer can observe the image from the same side of the reference light (this is called a "reflection hologram"). Which type of the hologram is preferable is determined by a user in accordance with situation of use of the display device.

However, since the interference fringe is recorded on the photosensitive dry plate through the diffusion body, for example, the frosted glass, there is cloudiness or cloudy state similar to the frosted glass on the screen hologram. As a result of the cloudy state, the transparency of the screen hologram becomes worse so that it is difficult to clearly observe the background of the screen hologram. Further, when the observer observes the screen hologram from another position which is not a normal position, and when the observer observes the is screen hologram in which no image is displayed thereon, from the normal position, the screen hologram looks like a smoked glass so that the observer sees a different image.

In the method for producing the screen hologram shown in FIGS. 28 and 29, the exposure is performed based on a ratio between an intensity ($E_R$) of the reference light and the intensity ($E_0$) of the object light. In this case, the intensity is defined by the light intensity of the reference/object light on the photosensitive dry plate which records the interference fringe. In general, the exposure is performed based on the ratio $E_R/E_0=1$.

In the case of the reflection hologram shown in FIG. 29, when the exposure is performed based on the ratio $E_R/E_0=1$, the interference fringe which is inherently required is recorded by the object lights $O_1$ and $O_2$ and the reference light $R_1$ on the screen hologram. However, when the exposure is performed based on the above ratio, another interference fringe formed by two object lights $O_1$ and $O_2$ is simultaneously recorded on the screen hologram. The above another interference fringe results in the cloudiness or cloudy state of the screen hologram mentioned above.

As another method for producing the screen hologram having improved transparency, the following method has been known. That is, the object light having directivity is irradiated onto the photosensitive dry plate from various directions in order to perform multi-exposure so that the screen hologram is produced. However, a lot of time is required for this method, and many structural parts are also required for an exposure apparatus.

Accordingly, the present invention aims to provide a method for easily producing the hologram (for example, screen hologram) having no cloudiness or cloudy state.

According to the present invention, basically, when a diffraction efficiency by the interference fringe formed by two object lights (this is formed by mutual interference between fellow object lights) is $\eta_{OO}$ and the diffraction efficiency by the interference fringe formed by the reference light and the object light is $\eta_{RO}$, the intensity $E_0$ of the object light and the intensity $E_R$ of the reference light are adjusted in such a way that the ratio between two diffraction efficiencies $\eta_{RO}/\eta_{OO}$ is at least 10 and the diffraction efficiency $\eta_{OO}$ does not exceed 5%. Accordingly, it is possible to eliminate the interference fringe formed by two object lights so that it is possible to realize a clear hologram having no cloudiness or cloudy state.

That, is, since the ratio between two diffraction efficiencies $\eta_{RO}/\eta_{OO}$ is set to 10, the intensity of the light diffracted by the hologram becomes low so that the image becomes dark. Accordingly, it is possible to avoid undesirable visibility. Further, since the diffraction efficiency $\eta_{OO}$ does not exceed 5%, it is possible to avoid undesirable transparency caused by cloudiness or cloudy state so that it is possible to realize clear and transparent screen hologram.

A first embodiment according to the present invention will be explained in detail with reference to the drawings.

Figure 2:
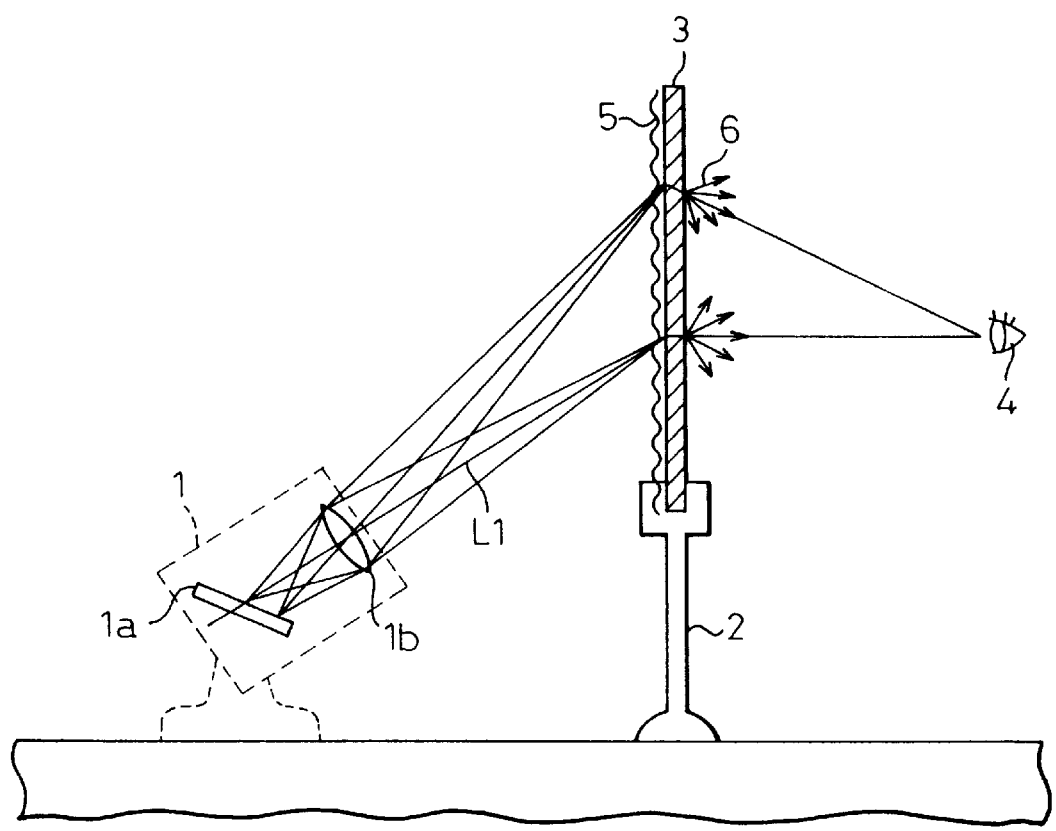
FIG. 2 shows a display device including the screen hologram shown in FIG. 1.

FIG. 2 is a basic structural view of a display device including a screen hologram. In this example, the transmission type screen hologram is used in the display device. That is, the projector 1 is provided for the screen hologram 3, and the image is projected to the screen hologram 3 so that the observer 4 can observe the image 5. As shown in the drawing, the projector 1 is formed by the display unit 1a and the lens 1b. The screen hologram 3 is provided apart from the projector 1 for a predetermined distance and is supported by a screen mount 2. Further, the observer 4 is located apart from the screen hologram for a predetermined distance, but this distance is larger than the length between the projector 1 and the screen hologram 3.

The light generated by the display unit 1a is focused by the lens 1b so that the image 5 is formed on the screen hologram 3. In this case, the display unit 1a is inclined to the optical axis L1 so that image 5 from the display unit 1a can be in focus over all the area of the screen hologram 3. In this case, a part of image 5 is changed to the diffraction light 6 by the screen holograms shown by arrows. The diffraction light 6 is a scattering light and a center of directivity is directed to an eye of the observer 4.

Figure 1:
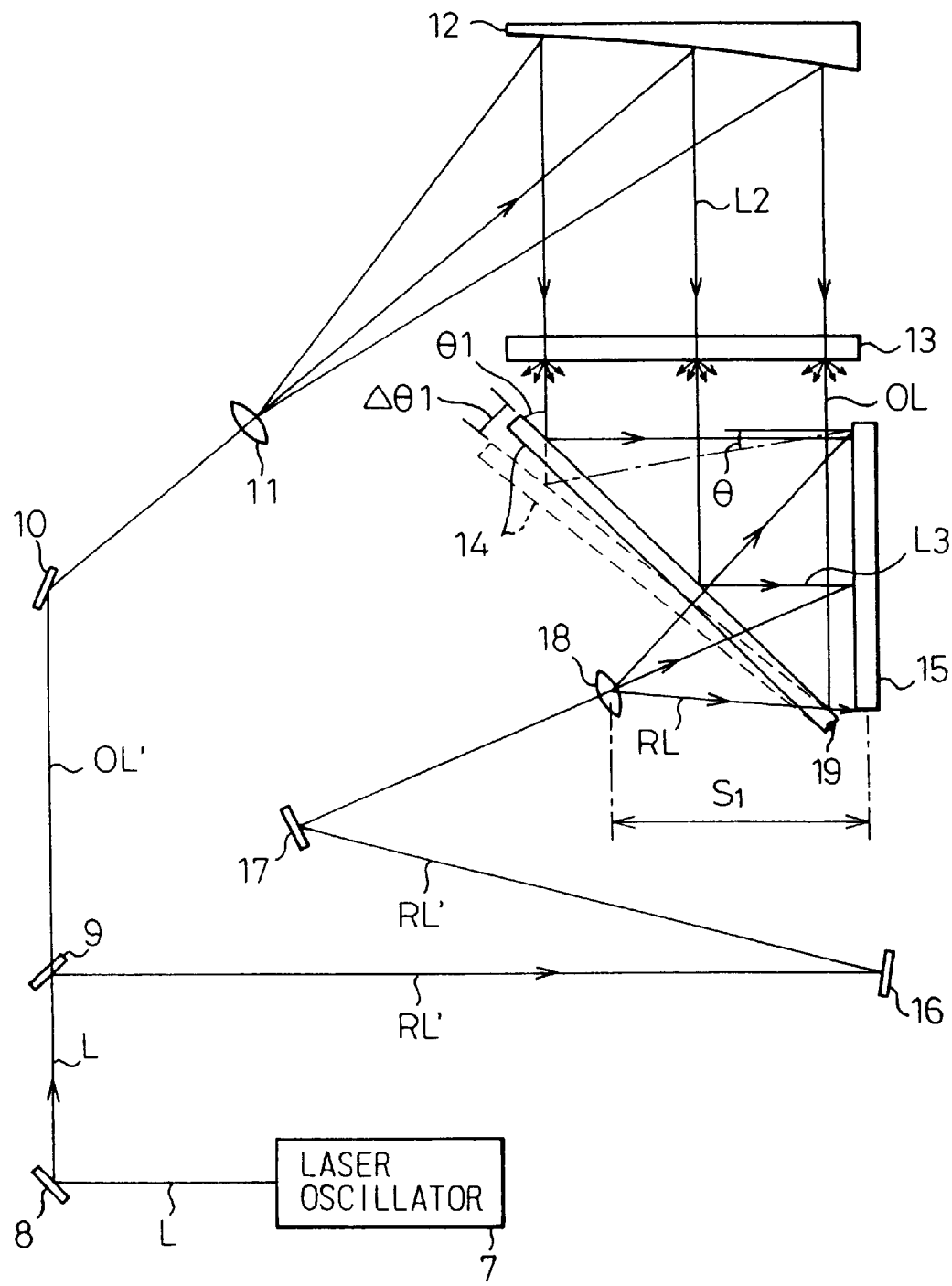
FIG. 1 shows an optical system for producing a screen hologram according to the present invention.

FIG. 1 shows a schematic structure of an optical system for exposure. In the drawing, reference number 7 denotes a laser oscillator; 8, 9, 10, 16 and 17 mirrors; 11 and 18 lenses; 12 an off-axis parabolic mirror; 14 a half transmission mirror; and 15 a photosensitive dry plate.

As shown in the drawing, the mirror 8 is facing the laser oscillator 7 on an optical axis L. The half transmission mirror (or half mirror) 9 is provided on the optical axis L. The mirror 10 is provided on the optical axis OL', and the object lens 11 is provided on the optical axis reflected by the mirror 10.

Further, the off-axis parabolic mirror 12 is provided on the optical axis by the lens 11. The light is expanded by the lens 11 and input to the off-axis parabolic mirror 12 so that the light is changed to a parallel light beam L2. The half transmission mirror 14 is provided on the light axis L2 through the light diffusion body (plate) 13, and the photosensitive dry plate (i.e., a hologram dry plate used as a screen hologram) 15 is provided on the light axis L3 reflected by the half transmission mirror 14.

As a preferred embodiment, a dichromate gelatin (DCG) is used as the photosensitive material on the photosensitive dry plate 15. Further, single-sided frosted glass (#1000) is used as the diffusion plate 13. Still further, except for the frosted glass, lenticular lens, opal glass, and combination of these materials, can be used as the diffusion plate 13.

The reflection mirror 16 is provided on an optical axis RL' reflected by the reflection mirror 9. The reflection mirror 17 is provided on an optical axis RL' reflected by the reflection mirror 16. Further, the photosensitive dry plate (or hologram dry plate) 15 is provided on an optical axis reflected by the reflection mirror 17 through the object lens 18 and the half transmission mirror 14.

As shown in the drawing, the hologram dry plate 15 is provided for the front side (i.e., right side) of the half transmission mirror 14, and the lens 18 is provided for the rear side (i.e., left side) of the half transmission mirror 14. Further, both hologram dry plate 15 and the lens 18 are arranged close to the hologram dry plate 14 so that the distance $S_1$ between the hologram dry plate 15 and the lens 18 becomes very small.

The half transmission mirror 14 is movable around a supporting point 19 (i.e., the angle of the mirror is changeable) so that it is possible to change the direction of light input from the diffusion plate 13, from upper to lower portion, and from right to left portion of the hologram dry plate 15.

That is, an angle θ1 of the half transmission plate 14 is adjusted so that it is possible to freely adjust the angle θ1 in which the object light from the diffusion plate 13 is input to the photosensitive dry plate 14.

Accordingly, when the angle of the half transmission plate 14 is inclined by 5° (see Δθ1=5°), the incident angle of the light to the hologram dry plate 15 is also inclined by 10° (see angle θ1).

In the above explanation, the explanation of a mechanism for changing the direction of the light to the left and right will be omitted.

In this embodiment, the intensity of the object light is set to the outside of the range for the sensitivity of the photosensitive dry plate 15, and is set to the value 40 mJ/cm$^2$ or less. Further, when the magnification of the lens 18 which is used for diverging the reference light is set to $n_R$, and when the magnification of the lens 11 which is used for diverging the object light is set to $n_0$, the ratio $n_0/n_R$ is set to the value 4 or more.

As explained above, the ratio $E_R/E_0$ between the intensity $E_0$ of the object light and the intensity $E_R$ of the reference light is set in such a way that the ratio $\eta_{RO}/\eta_{OO}$ between the diffraction efficiency $\eta_{OO}$ for the interference fringe formed by two object lights and the diffraction efficiency $\eta_{RO}$ for the interference fringe formed by the reference light is set to at least 10, and the diffraction efficiency $\eta_{OO}$ is set so as not to exceed 5%. More particularly, the ratio $E_R/E_0$ is set in such a way that the diffraction efficiency $\eta_{OO}$ is set so as not to exceed 2%.

Next, the steps for producing the screen hologram will be explained in detail below.

The angle of the half transmission mirror 14 is fixed as shown by the solid line in FIG. 1. The laser beam is generated by the laser oscillator 7. The laser beam is divided into two directions by the half mirror 9. One laser beam is reflected by the mirror 10 and is diverged by the object lens 11. The diverged laser beam is changed to the parallel beam L2 by the off-axis parabolic mirror 12 and is input to the diffusion plate 13 whereby the parallel beam is changed to diffused light. The diffused light is reflected by the half transmission mirror 14 and input to the photosensitive dry plate 15 as the object light.

On the other hand, the laser beam reflected by the half transmission mirror 9 is input to the lens 18 through the reflection mirrors 16 and 17, and changed to the diverged light. Further, the diverged light is transmitted through the half transmission mirror 14 and input to the photosensitive dry plate 15 as the reference light.

As a result, the interference fringe is formed by the object light from the diffusion plate 13 and the reference light through the half transmission light, and recorded on the photosensitive dry plate 15.

After the above steps, the half transmission mirror 14 is inclined by 5° (see Δθ1=5°) so that the incident angle θ1 of the light to photosensitive dry plate 15 is also inclined by 10°. In this situation, the laser beam is generated from the laser oscillator 7 to the mirror 9. The laser beam generated by the laser oscillator 7 is transmitted to the half transmission mirror 14 through the same route as the above so that another interference fringe formed by the object light and the reference light is recorded on the photosensitive dry plate 15.

Accordingly, two kinds of interference fringes, i.e., the former interference fringe which is formed when the half transmission mirror 14 is not inclined, and the latter interference fringe which is formed when the half transmission mirror 14 is inclined, are recorded on the photosensitive dry plate 15. Accordingly, by using the latter interference fringe, it is possible to expand the view area from the observer for the upper and lower directions.

Based on the same method as above, when the half transmission mirror 14 is further inclined to the right and left direction (i.e., different direction from the angel θ1), another interference fringe is recorded on the photosensitive dry plate 15. Accordingly, by using another interference fringes, it is possible to expand the view area from the observer for the right and left directions.

Figure 3:
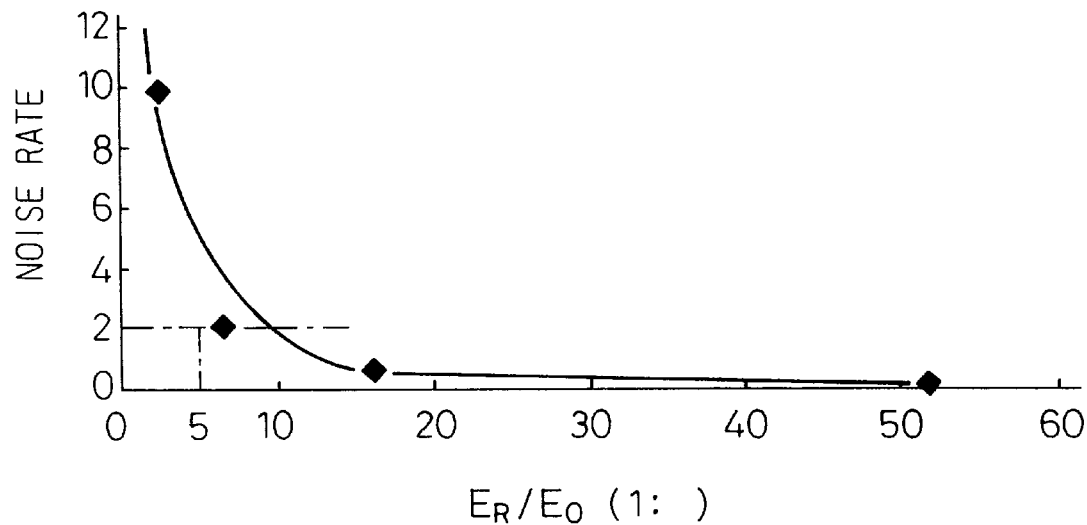
FIG. 3 is a graph for explaining a relationship between noise rate and a ratio $E_R/E_O$ between an intensity $E_O$ of an object light and an intensity $E_R$ of a reference light.

FIG. 3 is a graph for explaining the relationship between the noise rate and the ratio $E_R/E_0$ between two intensities. This graph shows the change of the noise rate when the ratio $E_R/E_0$ between two intensities is changed. Where, $E_R$ denotes the intensity of the reference light and $E_0$ denotes the intensity of the object light. Further, a dichromate gelatin (DCG) was used as the photosensitive dry plate 15, and #1000 single-sided frosted glass was used as the diffusion plate 13.

Figure 22:
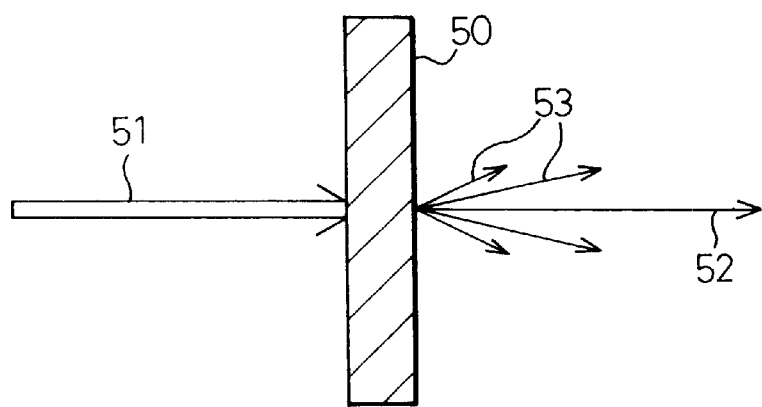
FIG. 22 is a view for explaining measurement of the noise rate.

The noise rate will be explained in detail with reference to FIGS. 22 and 23. The white light 51 (see FIG. 22) having the intensity $I_0$ is projected to the screen hologram 50. Next, the white light 51 is transmitted therethrough and scattered thereby so that the scattered light beams 52 and 53 can be obtained. The intensity $I_1$ of the transmission light 52 which is perpendicular to the screen hologram 50, is measured.

Figure 23:
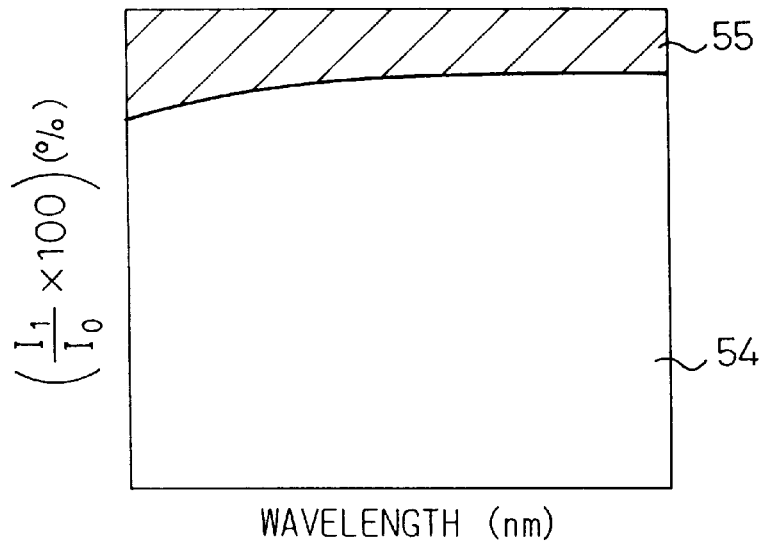
FIG. 23 is a view for explaining definition of the noise rate based on wavelength and the ratio of intensity.
Figure 24:
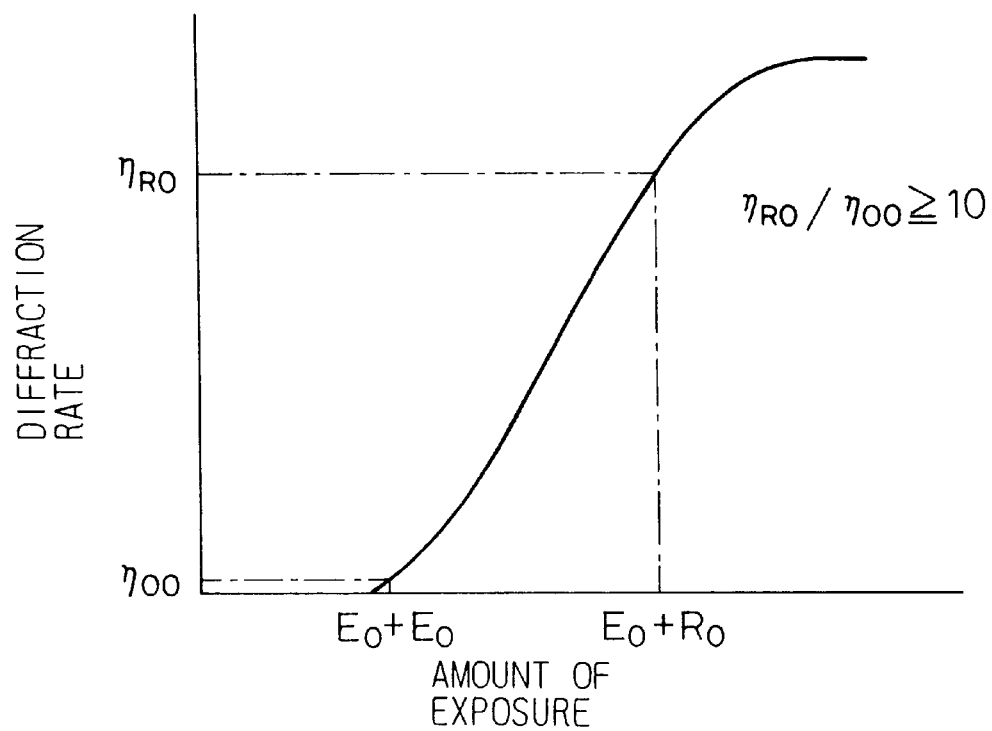
FIG. 24 is still another graph for explaining a relationship between the amount of exposure and the diffraction rate.

As a result of the measurement, the ratio between the intensity $I_0$ and $I_1$ is obtained as shown in FIG. 23. In FIG. 23, the area 54 shows transmission rate and the area 55 shows a sum of the noise ratio and absorption of the screen hologram. In this case, since the absorption is nearly "0" when the DCG is used as the screen hologram, it is possible to define the area 55 as the noise rate. When the noise rate is increased, cloudiness or a cloudy state occurs on the screen hologram so that it is very difficult to observe the background.

Further, the method for measuring the noise rate of the interference fringe formed by two object lights is as follows. That is, in the exposure optical system of the screen hologram, only the object light having the same amount as the actual photographing is exposed, and next, developing is performed after the reference light is irradiated in order to obtain hardening. After the above steps, the noise rate is measured.

In FIG. 3, when the ratio $E_R/E_0$ is set to 5 or more, the noise rate (i.e., cloudiness or cloudy state) becomes 2% and less so that it is possible to obtain the screen hologram having high transparency and no cloudiness or cloudy state.

As the method for obtaining the ratio $E_R/E_0=5$ or more, in the optical system shown in FIG. 1, concretely, the magnification $n_0$ of the lens 11 is set to a large value and the magnification $n_R$ of the lens 18 is set to a small value. As the ratio $n_0/n_R$, it is preferable to set the ratio of $n_0:n_R=4:1$ to $8:1$. Further, it is possible to set the ratio to a value larger than the above.

That is, when the magnification of the lens is set to the large value, the laser beam can be expanded so that it is possible to weaken the optical intensity which is irradiated onto the photosensitive dry plate.

The following are given to the explanation as to why the transparency can be increased and the noise rate can be reduced when the ratio $E_R/E_0$ is set to 5 or more.

Figure 4:
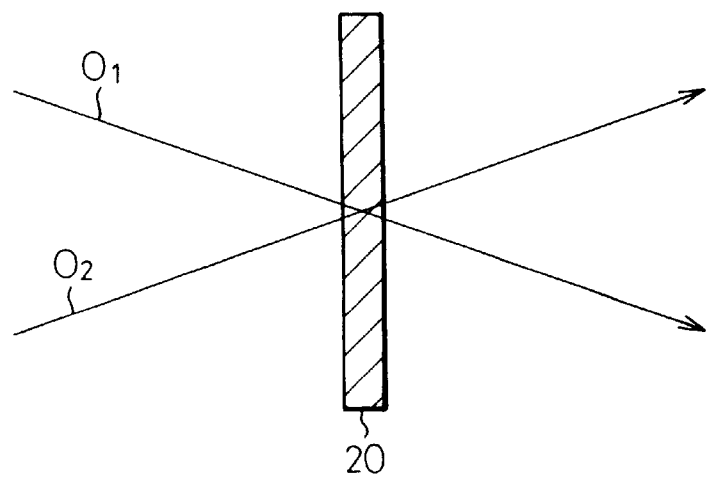
FIG. 4 is a view explaining a photosensitive dry plate and object light passing therethrough.

As mentioned above, it is necessary to provide two light beams which mutually interfere and have predetermined optical intensity in order to record the interference fringe on the photosensitive dry plate. As shown in FIG. 4, it is assumed that the interference fringe is formed on the photosensitive dry plate 20 by using the object light $O_1$ and another object light $O_2$.

Figure 5:
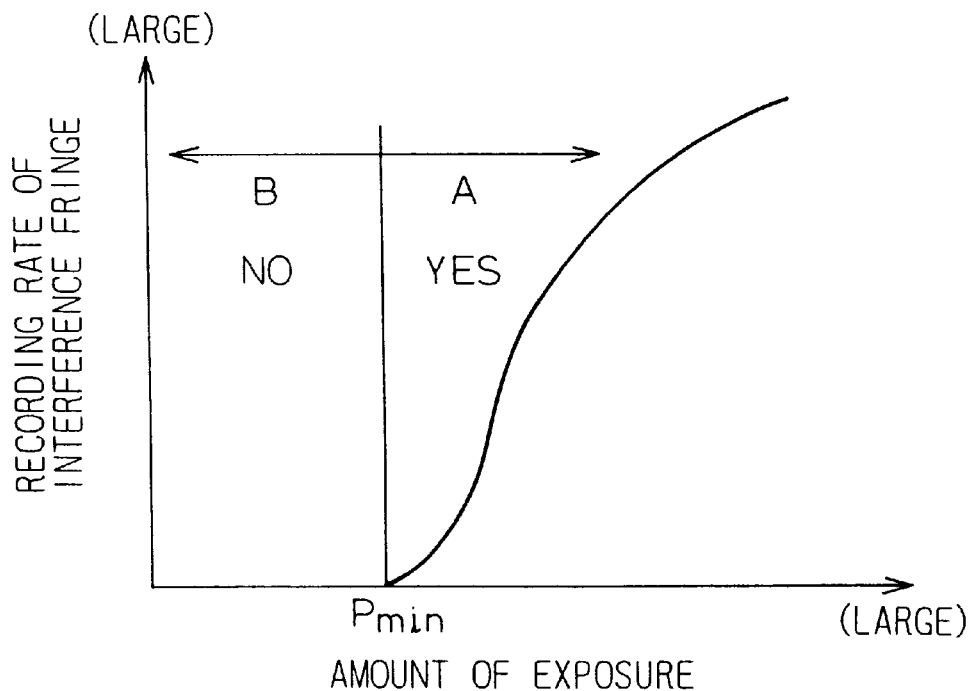
FIG. 5 is a graph for explaining a relationship between an amount of exposure and a recording rate of an interference fringe.

The amount of exposure which is necessary to record the interference fringe on the photosensitive dry plate 20 is shown by the graph in FIG. 5. When a sum of the optical intensity of the object light $O_1$ and another object light $O_2$ becomes large (see area A in FIG. 5), it is possible to record the interference fringe (see YES). On the other hand, when a sum of the optical intensity of the object light $O_1$ and another object light $O_2$ becomes small (see area B in FIG. 5), it is impossible to record the interference fringe (see NO).

Accordingly, when the dichromate gelatin (DCG) is used as the photosensitive dry plate 20, the minimum amount of exposure $P_{min}$ which is necessary to record the interference fringe is obtained. That is, when the ratio of the intensity between the object light $O_1$ and the object light $O_2$ is set to the ratio of one to one, the relationship between the amount of exposure and the diffraction efficiency is shown by the graph in FIG. 6. When the DCG is used as the photosensitive dry plate 20, the minimum amount of exposure became 10 $mJ/cm^2$.

Figure 30:
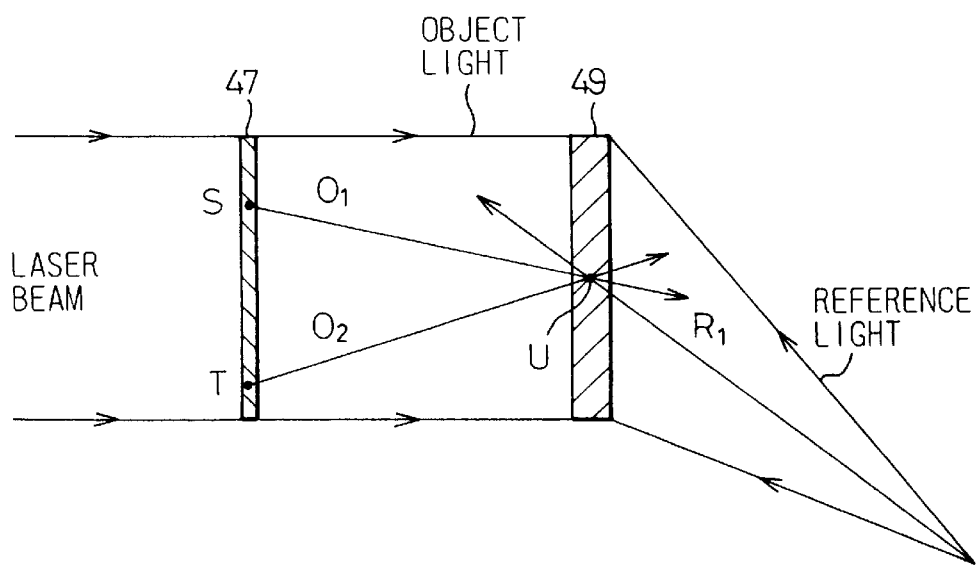
FIG. 30 shows an essential structure of the optical system.
Figure 31:
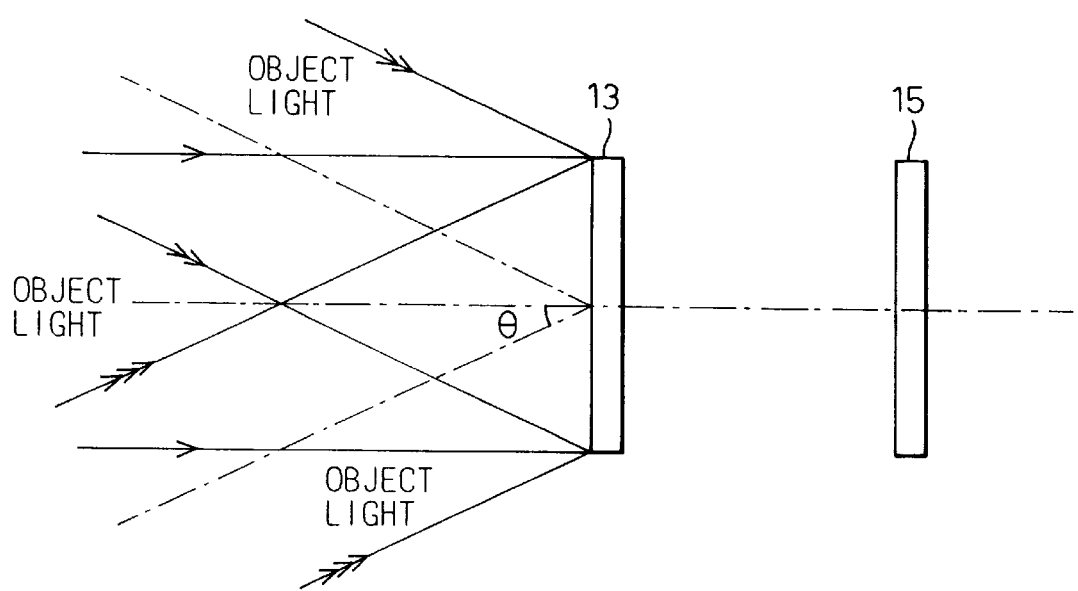
FIG. 31 is a view for explaining object light irradiated from different angles.

The transparent screen hologram is produced as follows based on above data. As one example, the following explanation is given to the reflection type screen hologram as shown in FIG. 30. It is assumed that the object light $O_1$ which is transmitted from a certain point S on the diffusion body 47 to a certain point U on the photosensitive dry plate 49, and another object light $O_2$ which is transmitted from a certain point T on the diffusion body 47 to the point U on the photosensitive dry plate 49. Further, it is assumed that the reference light $R_1$ is irradiated to the point U from the opposite side of the object light.

Figure 7:
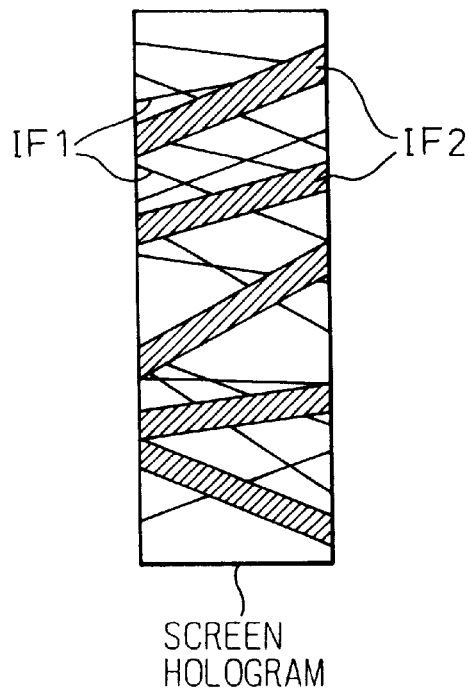
FIG. 7 shows a sectional structure of the screen hologram for explaining a relationship between interference fringes (slant portion) which are inherently necessary for producing the hologram, and Fresnel noise.

In this case, there are three kinds of the interference fringes which are formed on the point U of the photosensitive dry plate 49. That is, as shown in FIG. 7, the interference fringe IF1 is formed by two object lights $O_1$ and $O_2$, and the interference fringe IF2 is formed by the object light $O_1$ and the reference light $R_1$ and formed by the object light $O_2$ and the reference light $R_1$. As is obvious, the interference fringe IF1 results in the cause of cloudiness of the screen hologram so that this interference fringe IF1 is not required as a Fresnel noise.

On the other hand, the interference fringe IF2 is required to form the actual interference fringes on the photosensitive dry plate. Accordingly, if only the interference fringes formed by the object light $O_1$ and the reference light $R_1$ and formed by the object light $O_2$ and the reference light $R_1$ are recorded, and if the interference fringe formed by two object lights $O_1$ and $O_2$ is not recorded on the photosensitive dry plate, it is possible to realize the transparent screen hologram.

In this case, it is assumed that the ratio of the optical intensity between two object lights $O_1$ and $O_2$ is set to 1. In this case of the DCG as the photosensitive plate 20, if the sum of the optical intensity between two object lights $O_1$ and $O_2$ is set to the value 10 $mJ/cm^2$ or less, the interference fringe formed by two object lights $O_1$ and $O_2$ (i.e., Fresnel lens) is not recorded on the photosensitive dry plate.

On the other hand, it is assumed that the ratio of the optical intensity between the object light $O_1$ and the reference light $R_1$, or between the object light $O_2$ and the reference light $R_1$, is set to 1 (i.e., $E_R/E_0=1$). If the sum of the optical intensity between the object light $O_1$ and the reference light $R_1$, or between the object light $O_2$ and the reference light $R_1$, is set to the value 10 $mJ/cm^2$ or more, the interference fringe formed by the object light $O_1$ and the reference light $R_1$, or by the object light $O_2$ and the reference light $R_1$, is recorded on the photosensitive dry plate. In this case, however, the Fresnel lens is also recorded simultaneously on the photosensitive dry plate so that it is very difficult to realize the transparent screen hologram.

Figure 6:
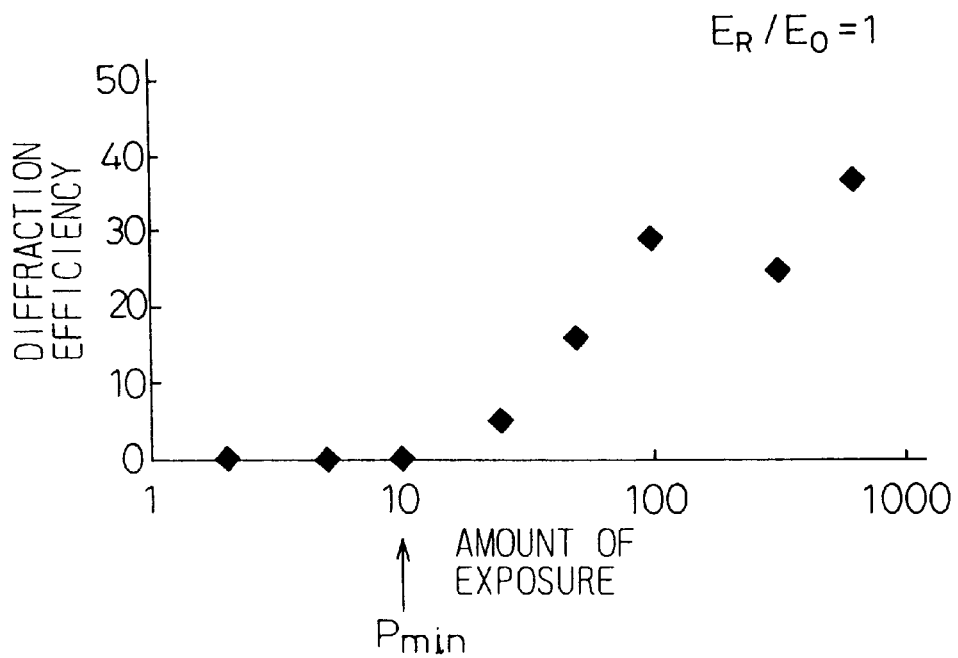
FIG. 6 is a graph for explaining a relationship between an amount of exposure and a diffraction efficiency.

That is, the interference fringe formed by the object lights $O_1$ and $O_2$ is not recorded on the photosensitive dry plate when the DCG is used as the photosensitive dry plate and when the amount of the object lights (i.e., amount of exposure obtained by adding the object lights $O_1$ and $O_2$) is 10 mJ/cm$^2$ as shown in FIG. 6.

On the other hand, the interference fringe which is required to form this screen hologram (i.e., interference fringe formed by the object light $O_1$ and the reference light $R_1$, or by the object light $O_2$ and the reference light $R_1$), is recorded on the photosensitive dry plate when the amount of exposure is 10 mJ/cm$^2$ or more. In this case, it is considered that the ratio of the optical intensity of the object lights $O_1$ and $O_2$ is set to 1. Accordingly, when the ratio $E_R/E_0$ of the intensity between the object light O and the reference light R is set to the large value, the interference fringe formed by the object light $O_1$ (or object light $O_2$) and the reference light $R_1$ is recorded on the photosensitive dry plate, and the interference fringe (i.e., as mentioned above, this becomes the cause of cloudiness or a cloudy state of the screen hologram) formed by the object lights $O_1$ and $O_2$ is not recorded on the photosensitive dry plate. Accordingly, it is possible to produce the transparent screen hologram.

Figure 8:
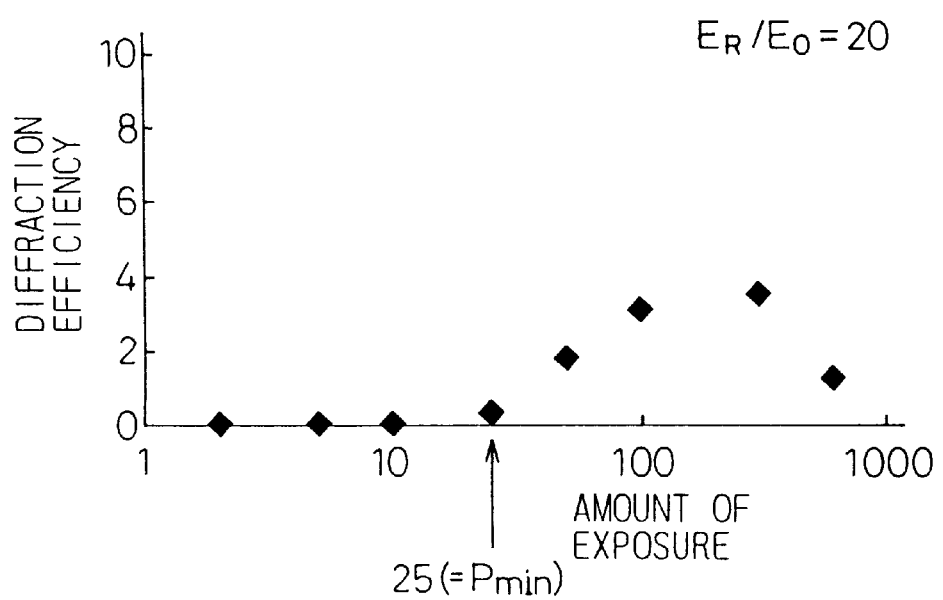
FIG. 8 is another graph for explaining a relationship between an amount of exposure and the diffraction efficiency.

Accordingly, it is assumed that the ratio $E_R/E_0$ of the intensity between the object light $O_1$ (or object light $O_2$) and the reference light $R_1$ is set to, for example, one to twenty (i.e., $E_R/E_0=20$). When the ratio of the optical intensity is set to one to twenty, and when the DCG is used as the photosensitive dry plate 20, the amount of exposure which can record the interference fringe is shown by the graph in FIG. 8. As is obvious from the graph, the sum of the optical intensity of the reference light $R_1$ and the object light $O_1$ (or object light $O_2$) is 25 mJ/cm$^2$ or more, it is possible to record the interference fringe on the photosensitive dry plate.

As a result, in FIG. 30, when $O_1=O_2=3$ mJ/cm$^2$, and $R_1=60$ mJ/cm$^2$ ($O_1:R_1=1:20$), the above conditions are achieved so that it is possible to realize a transparent screen hologram without cloudiness or a cloudy state like the Fresnel lens.

As shown in FIG. 9, by setting up an amount of exposure of the object light to 40 mJ/cm$^2$ and less, it is possible to set the noise rate to 2% or less. In this case, as shown in FIG. 6, when the amount of exposure is 40 mJ/cm$^2$, it is obvious that the diffraction efficiency becomes 5% or less. Accordingly, when the diffraction efficiency $\eta_{OO}$ is 5% or less, it is possible to realize a hologram having no noise. Further, it is required that not only reduction of noise, but also clear hologram is available for actual use.

Accordingly, it is necessary to provide a large diffraction efficiency $\eta_{RO}$ for the interference fringe formed by the reference light and the object light in comparison with the diffraction efficiency $\eta_{OO}$ for the interference fringe formed by two object lights. In this case, it is necessary to set the ratio $\eta_{RO}/\eta_{OO}$ to 10 or more. When the ratio $\eta_{RO}/\eta_{OO}$ is set to 10 or more, it is possible to realize a transparent screen hologram having little noise.

Further, in the transmission type screen hologram, it is possible to obtain the same effect as the reflection type.

As shown in FIG. 3, by setting the ratio $E_R/E_0$ to a large value, it is possible to reduce the noise rate of the screen hologram so that it is possible to eliminate cloudiness or the cloudy state thereof. Further, it is desirable to set the ratio $E_R/E_0$ to 5 or more in order to set the noise rate to 2% or less.

As shown in FIG. 9, when the amount of exposure of the object light is 40 mJ/cm$^2$ or less, it is possible to reduce the noise rate of the screen hologram to 2% or less.

In FIG. 1, the sectional area of luminous flux passing through the diffusion plate 13 is larger than the area of the photosensitive dry plate 15. That is, as shown in FIG. 10, the diffusion plate 21 is larger than the photosensitive dry plate 15. The object light which is incoming to the diffusion plate 21 is output as scattered light 22a, 22b and 22c, and this scattered light is recorded so as to diverge from one point on the photosensitive dry plate 15.

Figure 11:
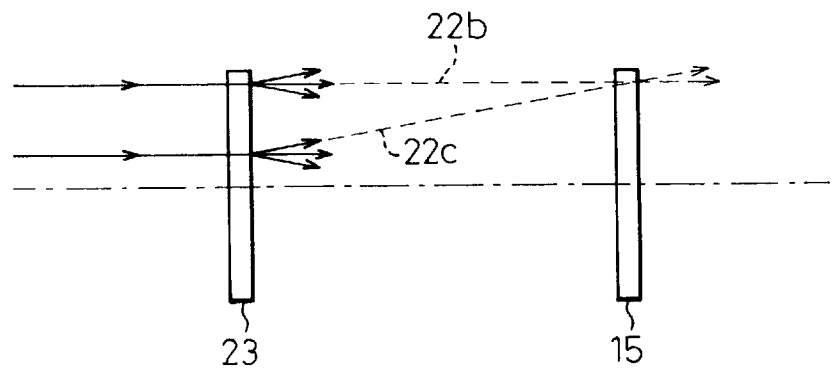
FIG. 11 shows the optical system for comparing the structure with FIG. 10.

In this case, as shown in FIG. 11, if the size of the diffusion plate 23 is equal to that of the photosensitive dry plate 15, the scattered light 22a is not recorded on the photosensitive dry plate 15. Accordingly, when observing the screen hologram produced by the optical system shown in FIG. 11 by using the system shown in FIG. 2, the peripheral portion of the screen hologram 3 becomes dark and is colored by the color distribution. On the other hand, when the screen hologram is produced by the method shown in FIG. 10, the peripheral portion becomes bright and is not colored so that it is possible to realize the clear screen hologram.

As explained above, the intensity $E_0$ of the object light and the intensity $E_R$ of the reference light are adjusted in such a way that the ratio $\eta_{RO}/\eta_{OO}$ between the diffraction efficiency $\eta_{OO}$ for the interference fringe formed by two object lights and the diffraction efficiency $\eta_{RO}$ for the interference fringe formed by the object light and the reference light is at least 10, and the diffraction efficiency qoo does not exceed 5%. As a result, the interference fringe formed by two object light beams is not formed so that it is possible to realize a clear screen hologram having no cloudiness or cloudy state. That is, since the ratio $\eta_{RO}/\eta_{OO}$ is set to at least 10, the intensity diffracted by the hologram so that it is possible to avoid problems of dark image and undesirable visibility.

Further, since the intensity of the object light was set out of the area of the sensitivity, the undesirable interference fringe formed by two object lights was not recorded on the photosensitive dry plate. Still further, since the intensity of the object light was set in the extent that the diffraction efficiency $\eta_{OO}$ for the interference fringe formed by two object lights is set so as not to exceed 2%, the clear and transparent screen hologram having n$_0$ cloudiness or cloudy state was realized, and the visibility of the background on the screen hologram was considerably improved.

Figure 25:
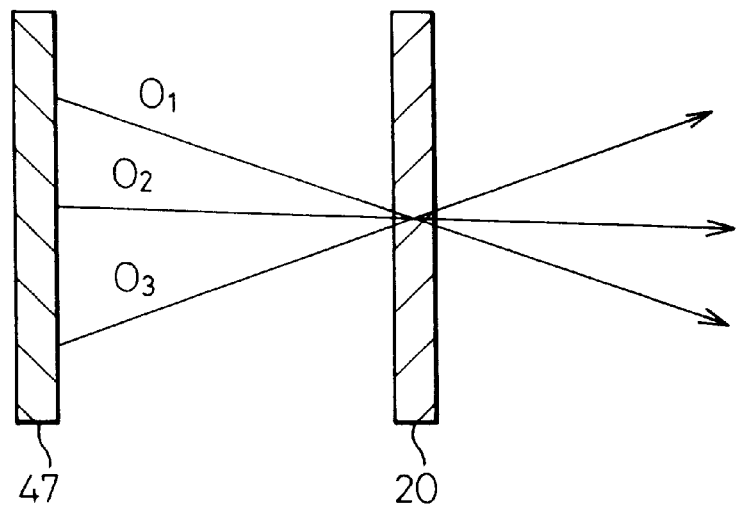
FIG. 25 is a view for explaining object light passing through the photosensitive dry plate.

As shown in FIG. 25, when the light passing through the diffusion body 47 is directed to only three directions, the amount of exposure of the interference fringe formed by the object lights $O_1$ and $O_2$ is 20 mJ/cm$^2$, and the amount of exposure of the interference fringe formed by the object lights $O_1$ and $O_3$ is also 20 mJ/cm$^2$. In this case, since the ratio of the object lights $O_1$ and $O_2$ is set to one to one, and the ratio of the object lights $O_1$ and $O_3$ is also set to one to one, the diffraction efficiency of the hologram is 5% or less as shown in FIG. 6.

In actuality, since the lights passing through the diffusion body 47 are directed to many directions, each diffraction efficiency for the interference fringe formed by the object lights becomes 5% so that it is possible to prevent cloudiness or the cloudy state of the screen hologram.

Still further, since the ratio $n_O/n_R$ between the magnification $n_R$ of the lens 18 for the reference light and the magnification $n_O$ of the lens 11 for the object light is set to 4 or more, it is possible to set the ratio $E_R/E_0$ to 5 or more.

Still further, since the photosensitive dry plate 15 and the object lens 18 are located closely by using the half transmission mirror 14, it is possible to eliminate unevenness of brightness of the image projected on the screen so that the observer can easily observe the image in the extent of whole area of the screen.

The following explanations are given to the hologram having a short focus. There is a known display device which projects an image from the projector to the screen hologram and observes the transmitted/reflected image. Concretely, in the transmission screen hologram, as shown in FIG. 26, the image is projected from the projector 42 in the rear side of the screen hologram 41, and the projected image is observed by the observer 43 in the front side of the screen hologram 41. On the other hand, in the reflection screen hologram, as shown in FIG. 27, the image is projected from the projector 45 in the front side of the screen hologram 44, and the projected image is observed by the observer 46 in the same side as the projector 45.

The method for producing transmission screen hologram is shown in FIG. 28. The laser beam is irradiated to the diffusion body 47, and the object light obtained thereby is irradiated to the photosensitive dry plate 48. Further, the reference light is irradiated from the lens in the same side as the object light so that the interference fringe is formed by the object and reference lights on the photosensitive dry plate 48.

On the other hand, the method for producing a reflection screen hologram is shown in FIG. 29. The laser beam is irradiated to the diffusion body 47, and the object light obtained thereby is irradiated to the photosensitive dry plate 49. Further, the reference light is irradiated from the lens in the opposite side of the object light so that the interference fringe is formed by the object and reference lights on the photosensitive dry plate 49.

For example, the Japanese Unexamined Patent Publication No. 4-298710 discloses the transparent screen hologram in which a real image formed on the screen is diffracted to a predetermined direction with directivity. That is, this document teaches that a plurality of interference fringes which are diffracted to a plurality of points located close to the observer are recorded on the hologram. This is performed in order to observe the whole area of the screen without unevenness of color. However, when the distance between the observer and the screen is short, it is necessary to provide the short focus as the lens function of the hologram (i.e., the hologram functions as the short focus lens).

In the reflection screen hologram, since the object light and the reference light are positioned opposite side each other for the photosensitive dry plate when producing the hologram, it is easy to provide the short focus. On the other hand, in the transmission screen hologram, the lens for the reference light is positioned within the area of the luminous flux (see FIG. 13) so that there is a problem in that the hologram cannot be produced as explained below.

Figure 12:
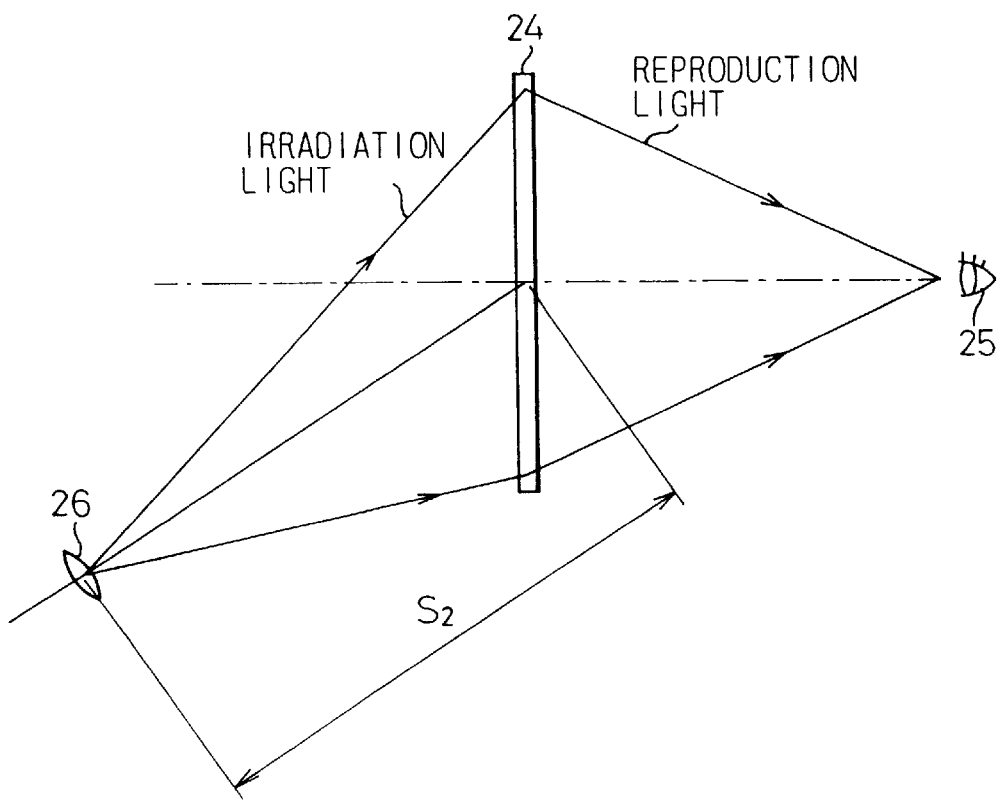
FIG. 12. shows an arrangement of the optical system including an observer.

That is, in FIG. 12, when the observer 25 observes the real image formed on the screen hologram 24, it is necessary to provide the function of field lens to the screen hologram 24 in order to reduce or eliminate the unevenness of color and brightness in the whole area of the screen. In this case, it is required that the screen hologram 24 includes the lens function so as to have the conjugated relationship between the projector lens 24 and the location of the observer 25.

However, the focal length of the field lens becomes shorter than the distance $S_2$ between the projector lens 26 and the screen hologram 24 shown in FIG. 12. Accordingly, when producing the transmission screen hologram having the short focus, it is impossible to produce such hologram because the object lens 27 is positioned within the area of the luminous flux of the object light as shown in FIG. 13.

According to the present invention, the half transmission mirror is arranged close to the photosensitive dry plate, the object light is reflected by the half transmission mirror and irradiated to the photosensitive dry plate. Further, the light diverging body is arranged close to the rear side of the half transmission mirror, and the reference light is irradiated through the half transmission plate. Accordingly, it is possible to avoid the arrangement of the object lens which is located within the luminous flux of the object light as shown in FIG. 13. As a result, it is possible to easily produce the hologram having the short focus which has short length between the object lens and the photosensitive dry plate.

The following explanation is given to an effect by the object light which is reflected by the half transmission mirror. In FIG. 12, when the observer 25 observes the real image formed on the screen hologram 24, it is necessary to provide the function of the field lens to the screen hologram 24 in order to reduce the unevenness of the brightness of the whole area on the screen. In order to realize this, it is necessary to have the relationship of the conjugation in position between the projection lens 26 and the observer 25.

Figure 13:
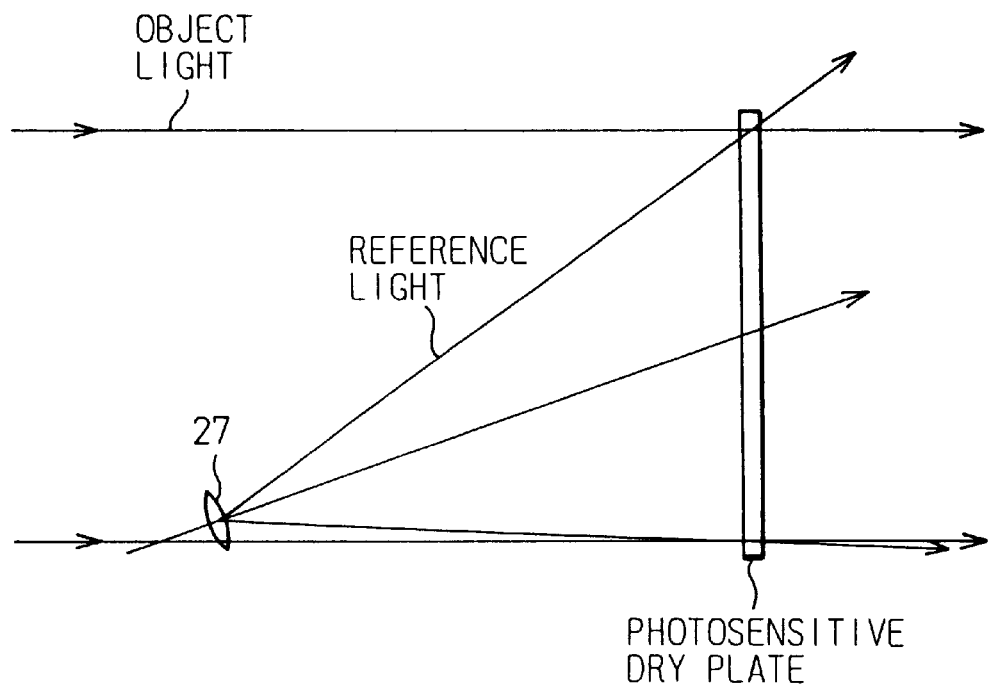
FIG. 13 is a view for explaining an undesirable arrangement of the lens for reference light.

As explained above, however, the focal length of the field lens becomes shorter than the length $S_2$ between the projector lens 26 and the screen lens 24 so that the object lens is positioned within the luminous flux of the object light as shown in FIG. 13 when producing the transmission hologram having the short focus.

In order to solve above problem, in the present invention, the half transmission mirror is arranged within the light path of the object light, and the object light is reflected by the half transmission mirror 14 and irradiated to the photosensitive dry plate 15. Further, the reference light is irradiated to the photosensitive dry plate 15 through the half transmission mirror 14. Accordingly, it is possible to set the length $S_1$ between the object lens 18 and the photosensitive dry plate 15 so as to become short so that it is possible to provide the hologram having the short focus. In this case, when the half transmission mirror 14 is arranged within the light path of the object light, there is no problem of the image since the contrast of the interference fringe formed by the reflection between the front and rear sides of the half transmission mirror 14 becomes low.

A second embodiment according to the present invention will be explained for essential points different from the first embodiment.

Figure 14:
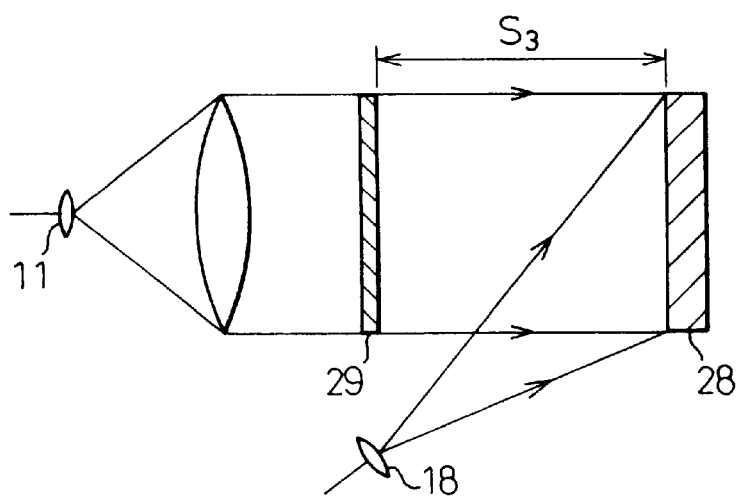
FIG. 14 is a view for explaining a desirable arrangement of the lens for reference light.

In this embodiment, as shown in FIG. 14, the length $S_3$ between the photosensitive dry plate (hologram dry plate) 28 and the diffusion body 29 is set to a large value in order to set the ratio $E_R/E_0$ to 5 or more. Concretely, the length $S_3$ is set to 5 (mm) or more. When the intensity of the object light which is input to the diffusion body 29 through the object lens 11 is constant, it is possible to change the ratio $E_R/E_0$ from 2 to 8 by changing the length $S_3$ from 5 to 400 (mm). Further, when the length $S_3$ is set to 400 (mm) or more, it is possible to set the ratio $E_R/E_0$ to 8 or more. As mentioned above, the reference light is irradiated from the object lens 18 for the reference light.

According to this embodiment, since the length (i.e., $S_3$) between the diffusion body 29 and the photosensitive dry plate 28 is set to a predetermined length (i.e., 5 mm) or more, it is possible to set the ratio $E_R/E_0$ to 5 or more.

A third embodiment according to the present invention will be explained for essential points different from the first embodiment.

Figure 15:
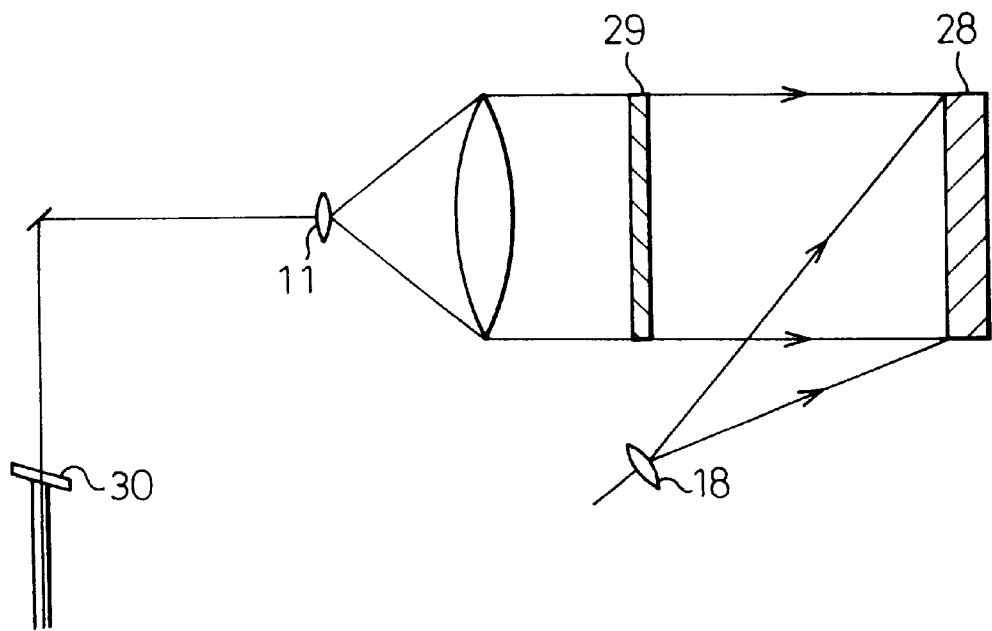
FIG. 15 is another view for explaining a desirable arrangement of the lens for reference light including an attenuation body for a laser beam.

In this embodiment, as shown in FIG. 15, in order to set the ratio $E_R/E_0$ so as to become 5 or more, an attenuation body 30 for attenuating the laser beam, such as a half mirror and the filter, is arranged in the side of the object light. Accordingly, it is possible to set the ratio $E_R E_0$ so as to become 5 or more.

According to this embodiment, since the attenuation body 30 (i.e., an attenuation material for attenuating the intensity of the light) is arranged on the way of the light path of the object light, it is possible to set the ratio $E_R/E_0$ to 5 or more. In this drawing, as mentioned above, reference number 28 denotes photosensitive dry plate, and reference number 29 denotes the diffusion body.

A fourth embodiment according to the present invention will be explained for essential points different from the first embodiment.

Figure 16:
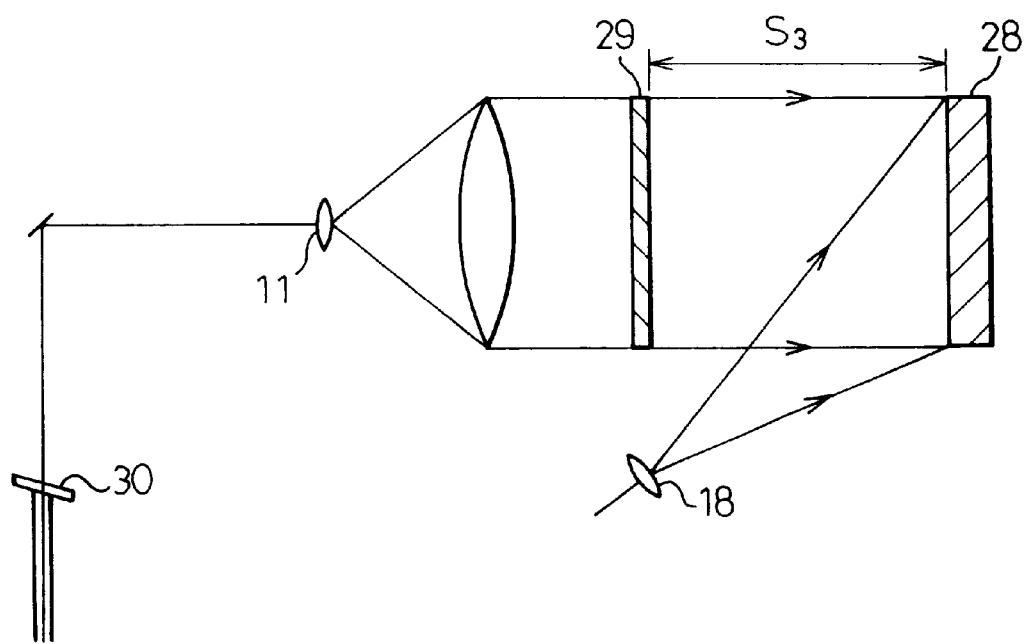
FIG. 16 is still another view for explaining a desirable arrangement of the lens for reference light including an attenuation body for a laser beam.

In this embodiment, as shown in FIG. 16, the first, second and third embodiments are combined in order to set the ratio $E_R/E_0$ so as to become 5 or more. That is, a) the ratio $n_0/n_R$ between the magnification $n_0$ of the lens 11 for the object light and the magnification $n_R$ of the lens 18 for the reference light is set to 4 or more; b) the length $S_3$ between photosensitive dry plate 28 and the diffusion body 29 is set to the large value; and c) the attenuation body 30 for attenuating the intensity of the laser beam.

According to the combination of above a) to c), it is possible to easily realize the ratio $E_R/E_0$ to 5 or more. Further, in the area where the ratio $E_R/E_0$ is 5 or more, it is possible to change stepwise the ratio when setting up it.

A fifth embodiment according to the present invention will be explained for essential points different from the first embodiment.

In this embodiment, in order to stabilize the characteristic of the hologram, the thickness of the photosensitive dry plate using the DCG is thinned. Concretely, the thickness is set to about 10 (mm) so that it is possible to produce the hologram having good characteristic.

The following are other embodiments.

As one embodiment, when recording the hologram, the intensities of the object and reference lights are calculated by considering the incident angles and intensities of various lights passing through the diffusion body, and the ratio $E_R/E_0$ is set to 5 or more in the whole area of the hologram dry plate. As a result, it is possible to ensure the transparency of the whole area of the hologram.

As another embodiment, a photosensitive material, such as a dye-sensitized DCG, or a photopolymer, is used as the photosensitive dry plate (hologram dry plate) 15.

In the above, explanations were given to the transmission screen hologram. Further, the above explanations can be applied to the reflection hologram having the structure as shown in FIG. 27. In this structure, the image is projected from the projector 45 on the screen hologram 44, and the projected image is observed by the observer at the same side of the projector 45.

Figure 17:
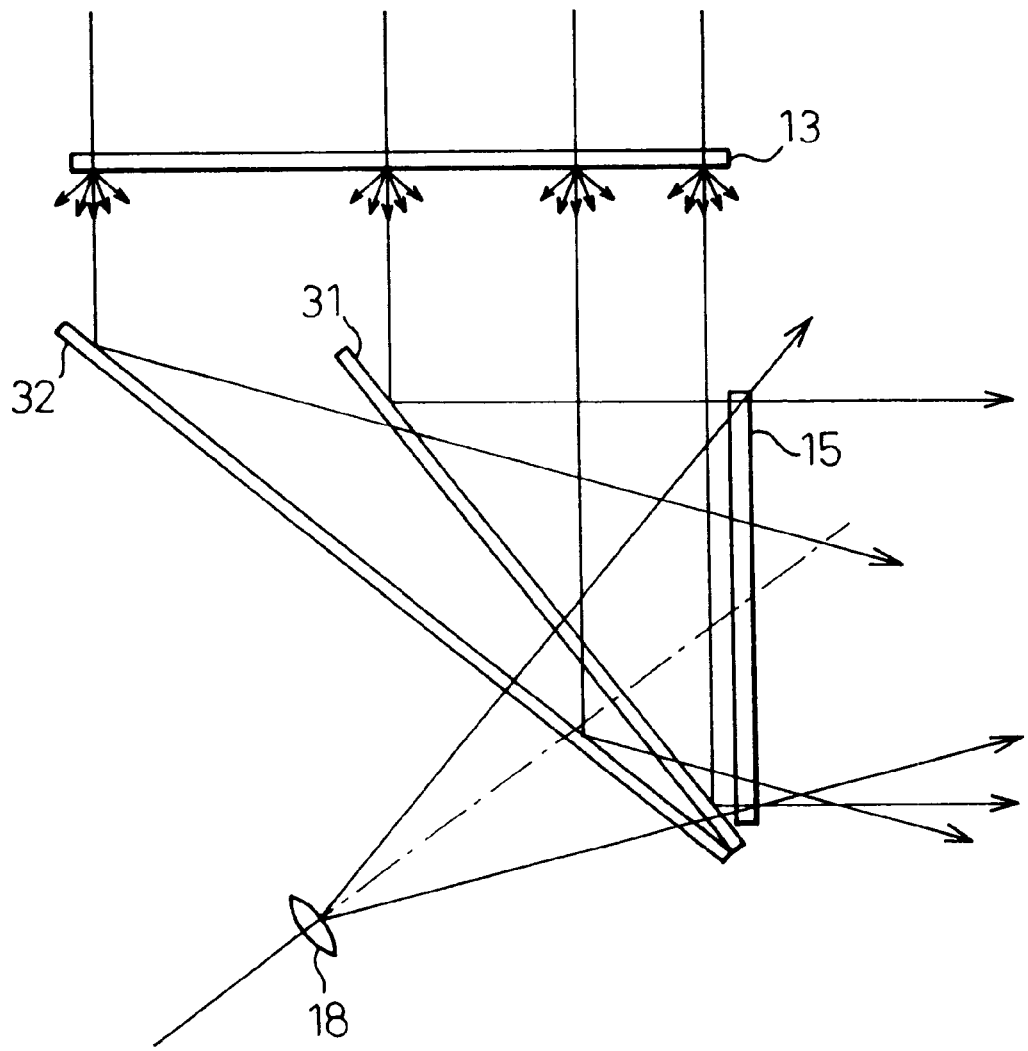
FIG. 17 shows an essential structure of the optical system.

As still another embodiment, as shown in FIG. 17, two half transmission mirrors 31 and 32 are arranged in the different angle each other (slanted), and the object lights diffused by the diffusion body 13 are reflected by the reflection mirrors 31 and 32 which are input to the photosensitive dry plate 15. Further, the reference lights diverged by the lens 18 are irradiated to the photosensitive dry plate 15 so that the interference fringe is formed on the photosensitive dry plate 15 based on the object light and the reference light.

Figure 18:
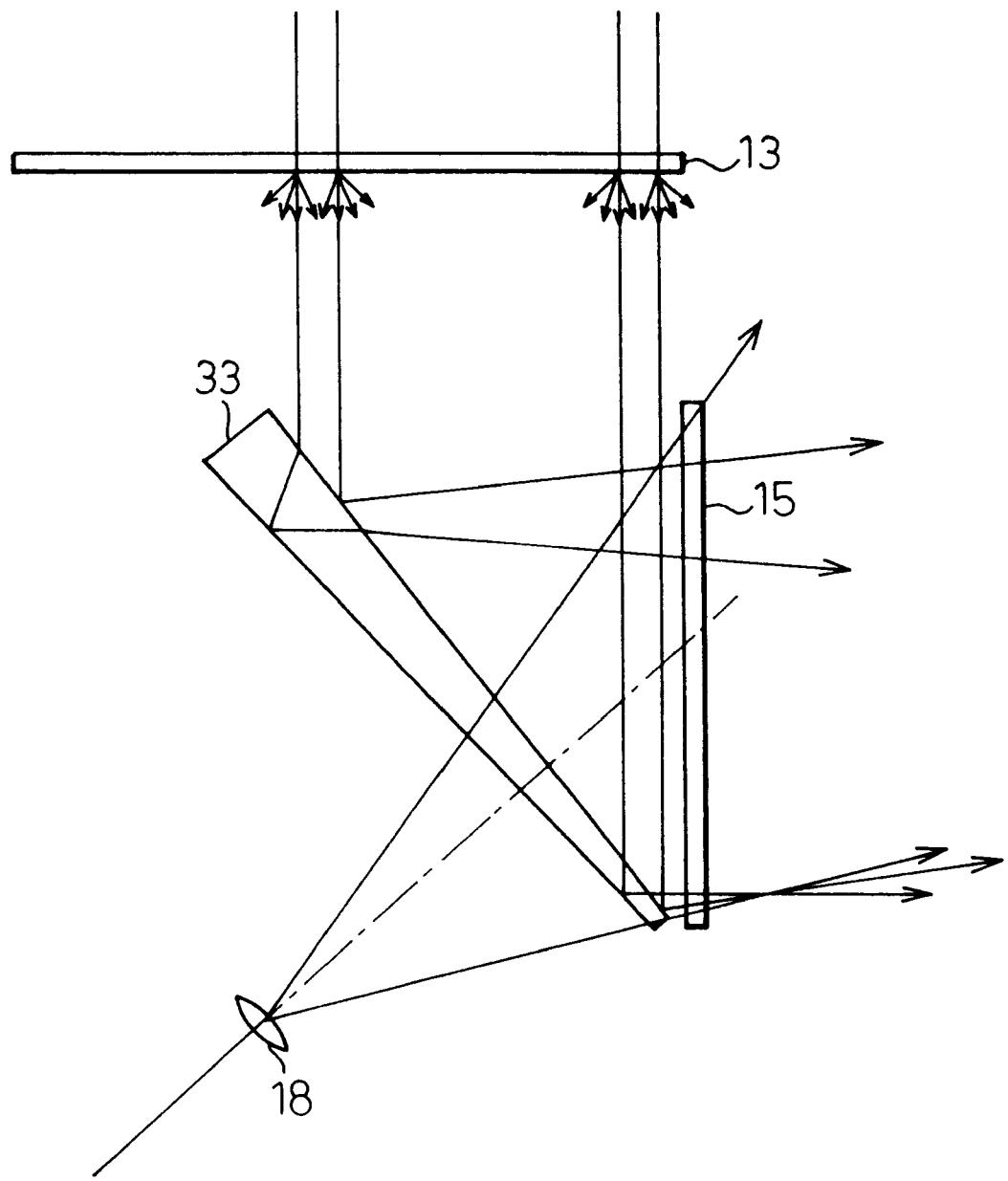
FIG. 18 shows another essential structure of the optical system.

As still another embodiment, as shown in FIG. 18, a wedge prism 33 is used as the half transmission mirror instead of two half transmission mirrors 31 and 32 shown in FIG. 17. As shown in the drawing, the direction of the reflection of the object light is different between the front side and the rear side in the wedge prism 33. Accordingly, it is possible to obtain the same effect as two half transmission mirrors 31 and 32.

Figure 19:
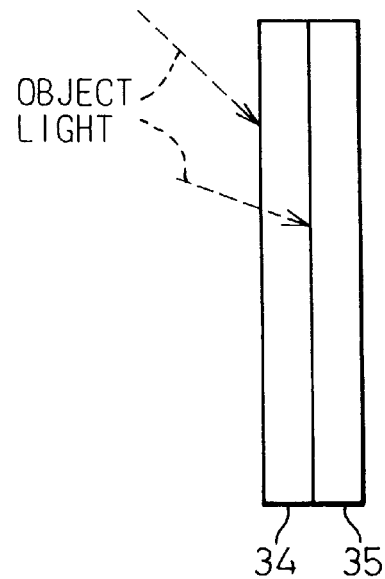
FIG. 19 shows an essential sectional structure of the hologram screen.

As still another embodiment, as shown in FIG. 19, two holograms 34 and 35 each having different directivity are separately and previously produced, and superimposed each other after completion of the hologram. According to this embodiment, it is possible to realize wide viewfield and to improve brightness of the display.

Figure 20:
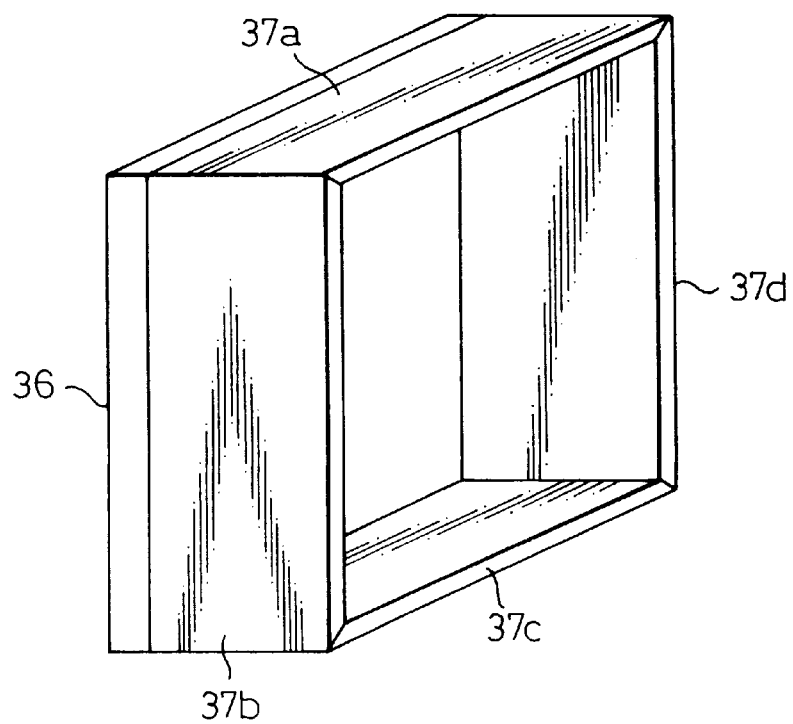
FIG. 20 is a perspective view for explaining the optical system for producing the screen hologram.
Figure 21:
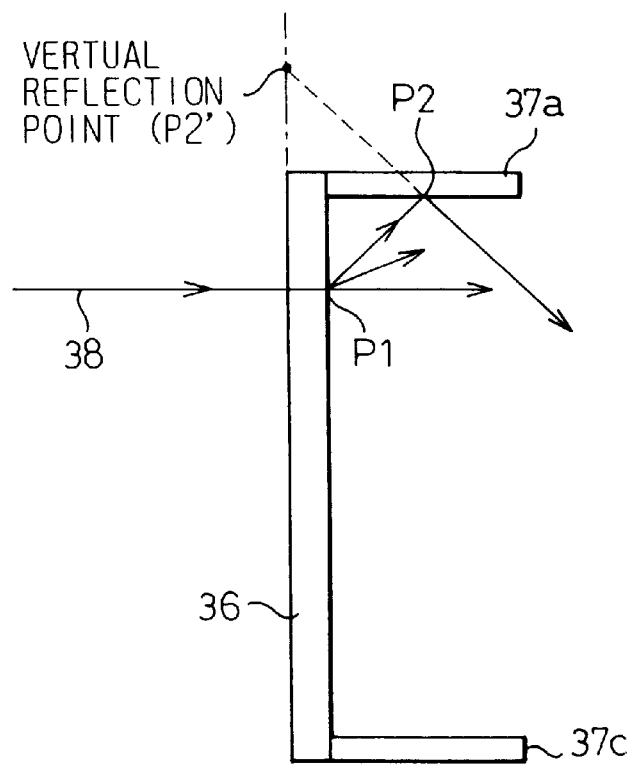
FIG. 21 shows a basic structure of the optical system shown in FIG. 20.

As still another embodiment, as shown in FIG. 20, four reflection mirrors 37a to 37d are provided to the diffusion plate 36 so as to form a box shown in the drawing. In this case, the diffusion plate is formed by a transmission type optical diffusion body, and each of four reflection member 37a to 37d is formed by a reflection mirror. Further, since the box is formed by the diffusion plate 36 and four reflection mirrors 37a to 37d, the reflection mirror and the transmission type opt:Lcal diffusion body are arranged so as to approximately intersect each other, and the reflection mirrors are provided in an outer area surrounding the transmission type optical diffusion body to these reflection mirrors 37a to 37d, it is possible to obtain the same effect as if the area of the diffusion plate 36 is broadened. This reason is explained with reference to FIG. 21. In the drawing, reference number 38 is an incident light (i.e., an object light), P1 is a diffusion point on the diffusion plate 36, P2 is a reflection point on the reflection mirror 37A, and P2' is a virtual reflection point which is positioned on an extended outer surface of the diffusion plate 36.

When the incident light is input to the diffusion plate 36 it passes through the diffusion plate 36 and is diffused at the point P1. Further, one of the diffused lights is (i.e., a first object light) is directly input to the photosensitive dry plate. The other diffused light (i.e., a second object light) is reflected at least once by the reflection mirror 37a at the point P2 and is input to the photosensitive dry plate. In this case, it is possible to consider the reflected light as the diffused light diffused from the virtual reflection point P2'on the extended outer surface of the diffusion plate 36. Accordingly, even if the area of the diffusion plate 36 is small, it is possible to obtain the same effect as the large diffusion plate.

Further, basically, it is not necessary to provide the particular chemical process on a surface of the half transmission mirror 14. However, it is desirable to provide a reflection-increasing material consisting of a dielectric multilayer film on the surface of the half transmission mirror 14. According to this process, it is possible to increase the intensity of the reflected light and to improve an utilization rate of the light so that it is possible to shorten the exposure time.

This is because the transmission rate of the light becomes relatively high in a normal glass so that much light is wasted in the exposure process. Further, since the exposure can be performed in a short time, it is possible to suppress blurring of the interference fringe caused by vibration during exposure.

As still another embodiment, as the photosensitive material, not only a DCG, but also a photopolymer or a silver salt can be used as the hologram material.

The following explanations are given to a display device using the screen hologram.

Figure 32:
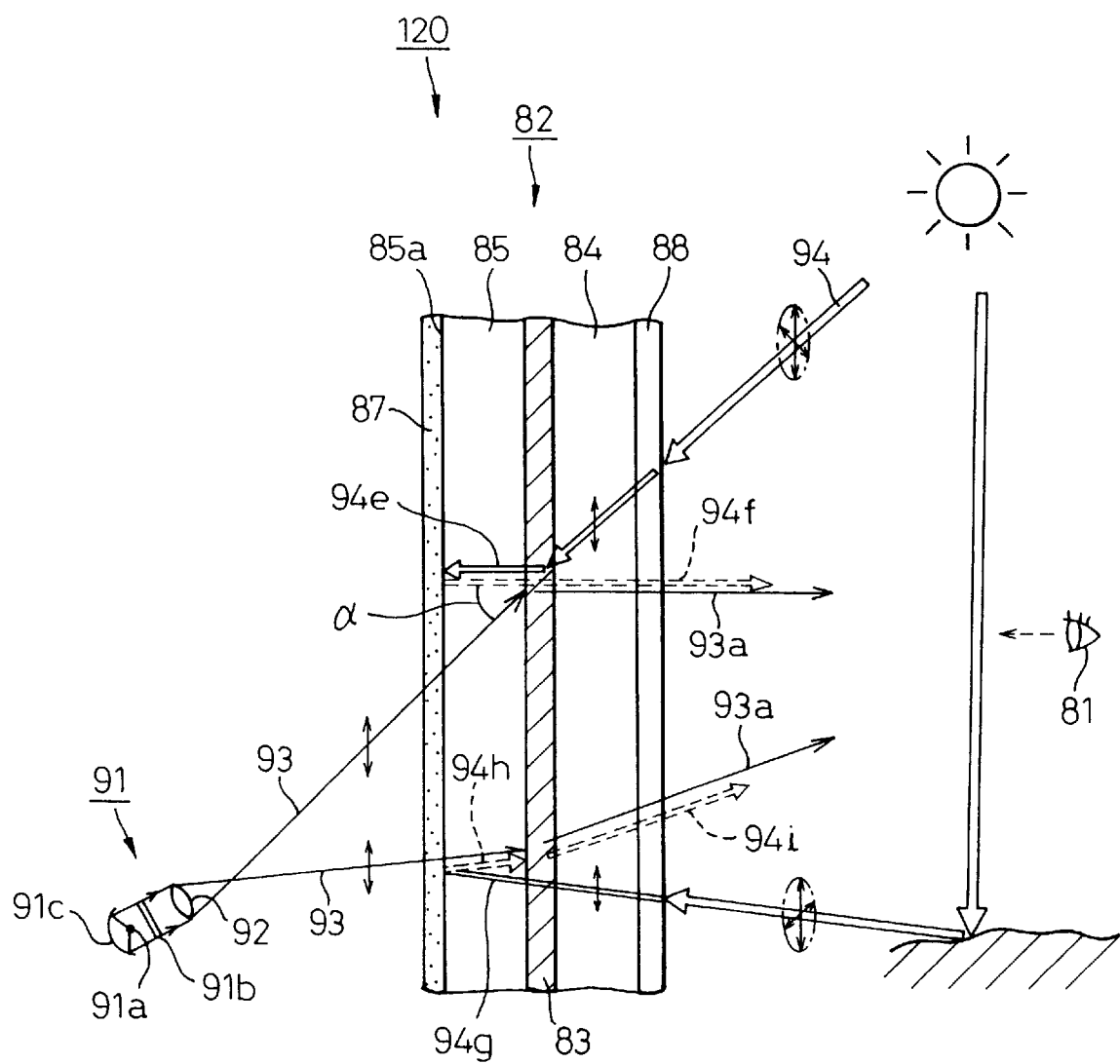
FIG. 32 shows an essential structure of a display device according to the present invention.

As one embodiment, FIG. 32 shows a display device using the hologram. The display device 120 includes a display unit 91 generating a light signal 93 recording the image to be displayed; the hologram screen 82 formed by the transmission hologram plate 83 and having the directivity in order to diffract and transmit the light signal 93, which is input based on a predetermined angle range α, to the observer 81; and a projecting unit (image lens) 92 for projecting the light signal 93 to the hologram screen 82.

Further, a reflection preventing material 87 having transparency is provided in the rear side (i.e., left side of the drawing) of the hologram screen 82. The reflection preventing material 87 has a low reflection rate for the incident angle of the first noise light 94e or for another incident angle of the second noise light 94g. In this case, the first noise light 94e is input from the direction opposite to the angle range α to the hologram plate 83, and is diffracted and transmitted therethrough. The second noise light 94g is input through the hologram plate 83 and reflected to the same direction as the angle range α.

Further, the hologram plate 83 has a high diffraction efficiency for the light polarized in a predetermined direction. A polarization optical element 88 is arranged in the front side (i.e., right side of the drawing) of the hologram screen 82. In this embodiment, the polarization optical element 88 is formed by a polarization plate or a polarization film in order to selectively transmit the light.

Concretely, the display unit 91 is formed by a light source 91a, a liquid crystal element 91b recording the image, and a reflector 91c for converting the divergence light to the parallel light. The hologram screen 82 is formed by the hologram plate 83, transparent boards 84 and 85, the reflection preventing material 87 and the polarization optical element 88.

The hologram plate 83 is formed by the transparent transmission-hologram. For that purpose, a zero-dimensional diffracted light is not input to the observer 81, and the light signal 93 is irradiated from the image lens 92, which is located to the lower left of the hologram screen 82, to the hologram plate 83. The angle of the irradiated light 93 is bent by diffraction of the hologram plate 83 so that the diffracted light 93a is scattered around an approximately horizontal direction. As a result, the observer 81 can observe the image through the diffracted light 93a (see 93a of FIG. 34). The angle to be bent between the signal light 93 and the diffracted light 93a is set to the range of 30 to 40° in the center portion of the hologram screen 82.

The interference fringe of the hologram plate 83 is formed by the optical system shown in FIG. 1. As mentioned above, the dichromate gelatin (DCG) is used as the photosensitive dry plate 15, and the frosted glass having the surface roughness #1000 is used as the diffusion plate 13.

That is, as mentioned above, in FIG. 1, the coherent light L generated by the laser oscillator 7 is reflected by the mirror 8 and divided by the half mirror 9 into the object light OL' and the reference light RL'. The object light OL' is reflected by the mirror 10 and diverged by the object lens 11 so that the diverged light is input to the off-axis parabolic mirror 12. The parallel light, which is obtained by the off-axis parabolic mirror 12, is reflected by the half mirror 14 through the frosted glass 13, and is input to the hologram plate 15.

On the other hand, the reference light RL', which is reflected by the half mirror 9, is diverged by the object lens 18 and input to the hologram plate 15 through the half mirror 14. As a result, the transmission hologram is formed on the hologram plate 15. As a result, when irradiating the reconstructed light onto the transmission hologram, the observer observes the image on the hologram plate 83 as shown in FIG. 32.

In this case, the diffraction efficiency of the hologram is approximately 30 to 40%. Further, the difference between an angle which the intensity of the scattered light becomes half and the angle which the intensity of scattered light becomes maximum, is approximately 6°. Still further, a screen gain of the hologram screen 82 is approximately 9.

The display unit 91 is formed by the light source 91a such as a metal halide lamp, and a transmission type liquid crystal 91b. For example, when the metal halide lamp (20 W) (all luminous fluxes of this lamp are 1300 lumen (1 m)) and a color liquid crystal element having a size of 1.3 inches and a transmission rate of 3%, are used as the display unit, and when the efficiency of an illumination system, for example, the reflector 91c, is 50% and the efficiency of the image lens 92 is 80%, all luminous fluxes which are output from the image lens 92, become 13 lumen (1 m).

As a result, when the size of the display portion of the hologram screen 82 is 10 inches (0.03 $m^2$), an illuminance to the screen based on the luminous flux (13 lumen) becomes 43 lux (1 $m/m^2$). Since the screen gain of the hologram screen 82 is 9, a display brightness becomes 1200 candela ($cd/m^2$). In this case, the display luminance can be expressed by the following formula, i.e., $$\text{display luminance} = \text{illuminance} \times \text{screen gain} \div \pi \quad (1)$$

The display luminance is sufficiently large since the display luminance of a CRT display or a direct viewing type LC panel is 10 to 200 $cd/m^2$. However, in the display device 120 in this embodiment, since the light of the background transmits through the hologram screen 82, it is necessary to determine the display luminance in the viewpoint of the contrast between the background and the image.

Figure 36:
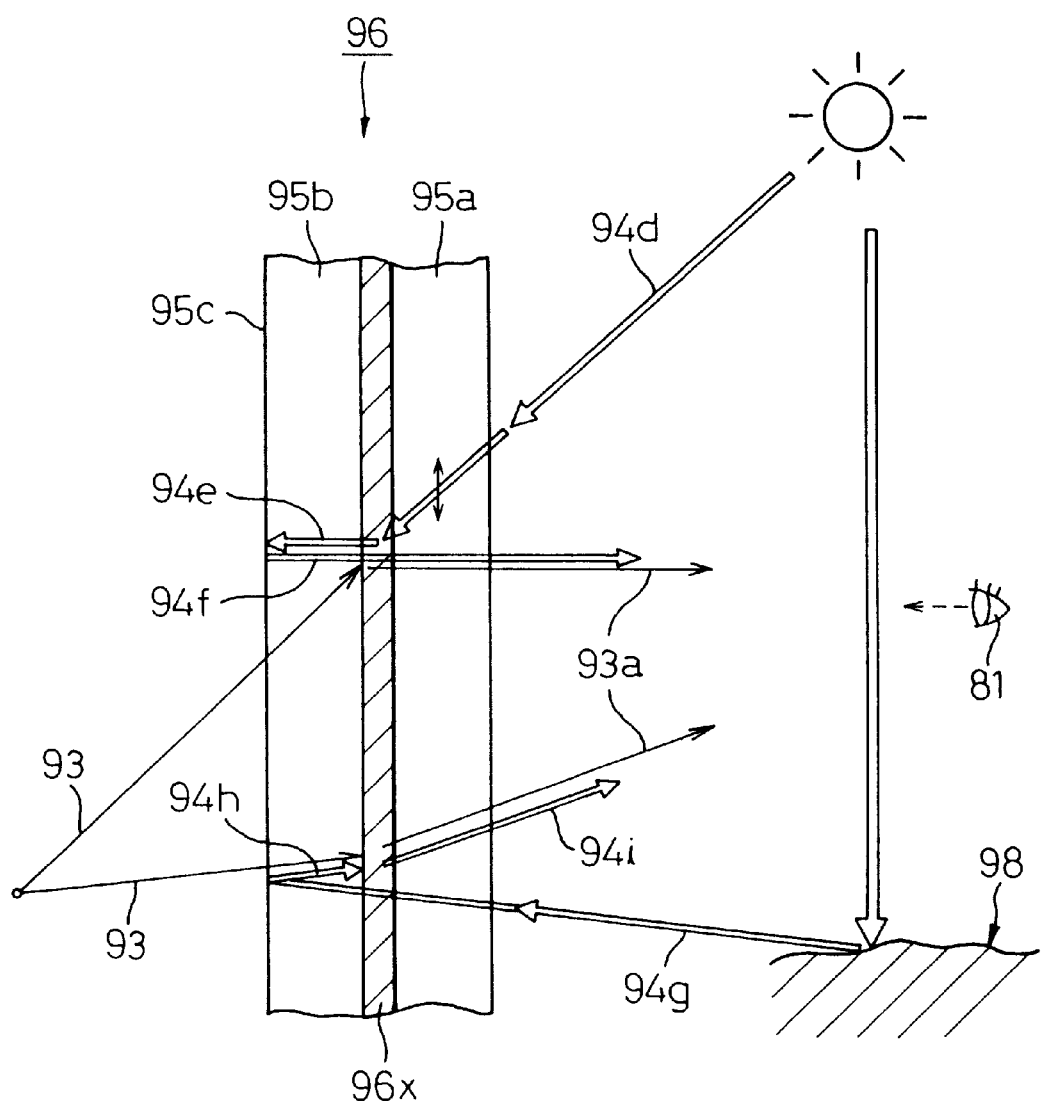
FIG. 36 is a view for explaining light paths of signal light and noise light in the transmission hologram.

For example, when the display device 120 is used out of doors, the illuminance at the time when the solar light is directly irradiated corresponds to $10^5$ lux, and the display illuminance calculated by the formula (1) corresponds to $28.6 \times 10^4$ $cd/M^2$. Accordingly, if the reflection preventing material 87 and polarization optical element 88 are not provided as shown in FIG. 36, the surface luminance becomes as follows. That is, when the reflection rate at a boundary surface 95c (85a of FIG. 32) between the air and the board 95b (85 of FIG. 32) is 4%, the solar light 94d is irradiated from the direction opposite to the signal light 93 input by the angle range α, to the hologram screen 96 (82) so that it becomes the first noise light 94e. As a result, the surface luminance at the time when the solar light is reflected by the boundary surface 95c (85a), becomes $1.14 \times 10^4$ $cd/m^2$.

This value reaches nine times of the surface luminance of the image so that the image is completely erased (or, washed out) from the screen.

Similarly, if the reflection preventing material 87 and the polarization optical element 88 are not provided as shown in FIG. 36, the surface luminance at the time when the second noise light 94g is reflected by the boundary surface 95c (85a), becomes $1.14 \times 10^4$ $cd/m^2$ so that the image is completely erased from the screen.

However, in the present invention, since the reflection preventing material 87 and the polarization optical element 88 are provided for the side of each transparent board 84 and 85 as shown in FIG. 32, it is possible to prevent "washing out" of the image from the noise light 94e and 94g.

The reflection preventing material 87 of this embodiment is formed by a multilayer interference film which is formed by a plurality of laminated interference films in order to suppress broadband reflection. In this case, the thickness of the multilayer interference film is determined so as to obtain good effect for suppression of reflection at the incident angle of the signal light 93 to the hologram screen 82.

The reflection rate of the noise lights 94e and 94g based on the reflection preventing material 87 can be easily set to one-tenth or less of the reflection rate of the boundary surface 95c between the board 95b and the air. As a result, the surface luminance of the undesirable noise lights 94 and 94i becomes $1.14 \times 10^3$ cd/m$^2$ (in FIG. 32, noise lights 94f and 94i are shown by dotted lines in order to express weak intensity). This surface luminance is approximately equal to the surface luminance of the image so that it is possible to easily observe the image on the screen.

The polarization optical element 88 cuts off the light which forms a crossed Nicol to the polarization axis, and converts the solar light 94 which is not polarized (see an oval on the solar light 94 in FIG. 32), to the linear polarization light (see solid arrow lines having both direction on the solar light 94 in FIG. 32). Accordingly, the intensity of the solar light 94 is attenuated about one-third thereof when the solar light is transmitted through the polarization optical element 88 and into to the hologram screen 82. Accordingly, the surface luminance of the undesirable noise light 94f and 94i becomes about 367 cd/m$^2$.

On the other hand, since the light diffracted by the hologram with high efficiency is not attenuated by the polarization optical element 88, the surface luminance of the image is not changed (1240 cd/m$^2$). According to the display device in this embodiment, it is possible to clearly recognize the image under an environment where the extremely strong light, such as a direct solar light, exists.

Another embodiment of the display device is explained below.

Figure 33:
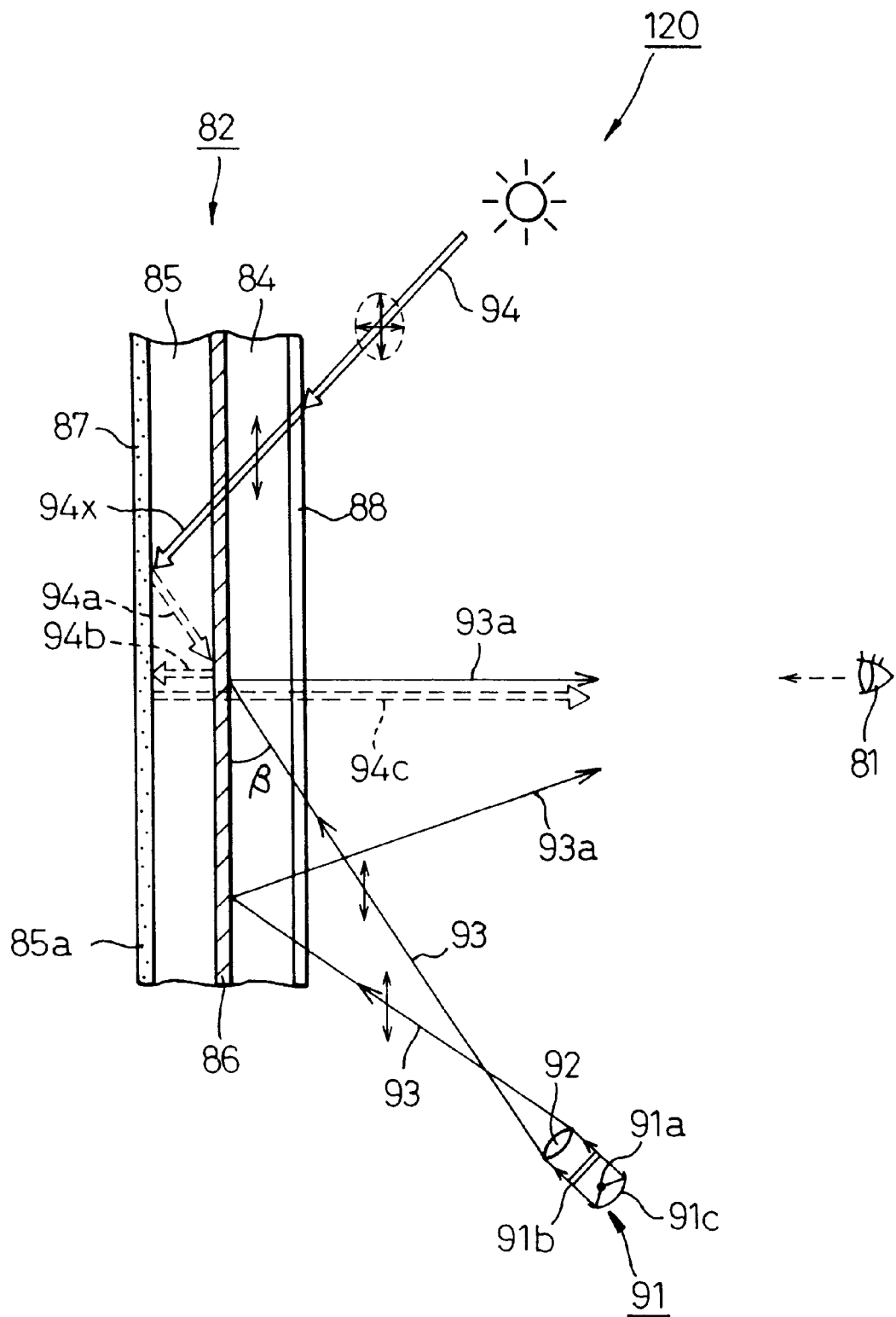
FIG. 33 shows an essential structure of a display device according to the present invention.

As shown in FIG. 33, the hologram plate 86 having the reflection type is used in this embodiment. In the display device 120, the reflection preventing material 87 is provided in the rear side (i.e., left side of the drawing) of the reflection hologram plate 86.

The reflection preventing material 87 has a low reflection rate to the incident angle of the noise signal as explained below. That is, it has the low reflection rate to the incident angle of the third noise light 94a (this is caused by the solar light 94 normally reflected by the material 87) which is directed opposite to the signal light 93 having the angle range β, or to the incident angle of the fourth noise light 94b which is caused by the third noise light 94a diffracted and transmitted by the hologram 86.

Accordingly, it is possible to considerably reduce the undesirable noise light 94c (see dotted arrow) caused by the third noise light 94a and the fourth noise light 94b so that it is possible to improve the contrast of the image for the background.

Further, since the intensity of the undesirable noise light 94c is weakened to one-third of the solar light 94 when it transmits the polarization optical element 88, it is possible to raise the contrast of the image more and more.

Still another embodiment of the display device is explained below.

Figure 34:
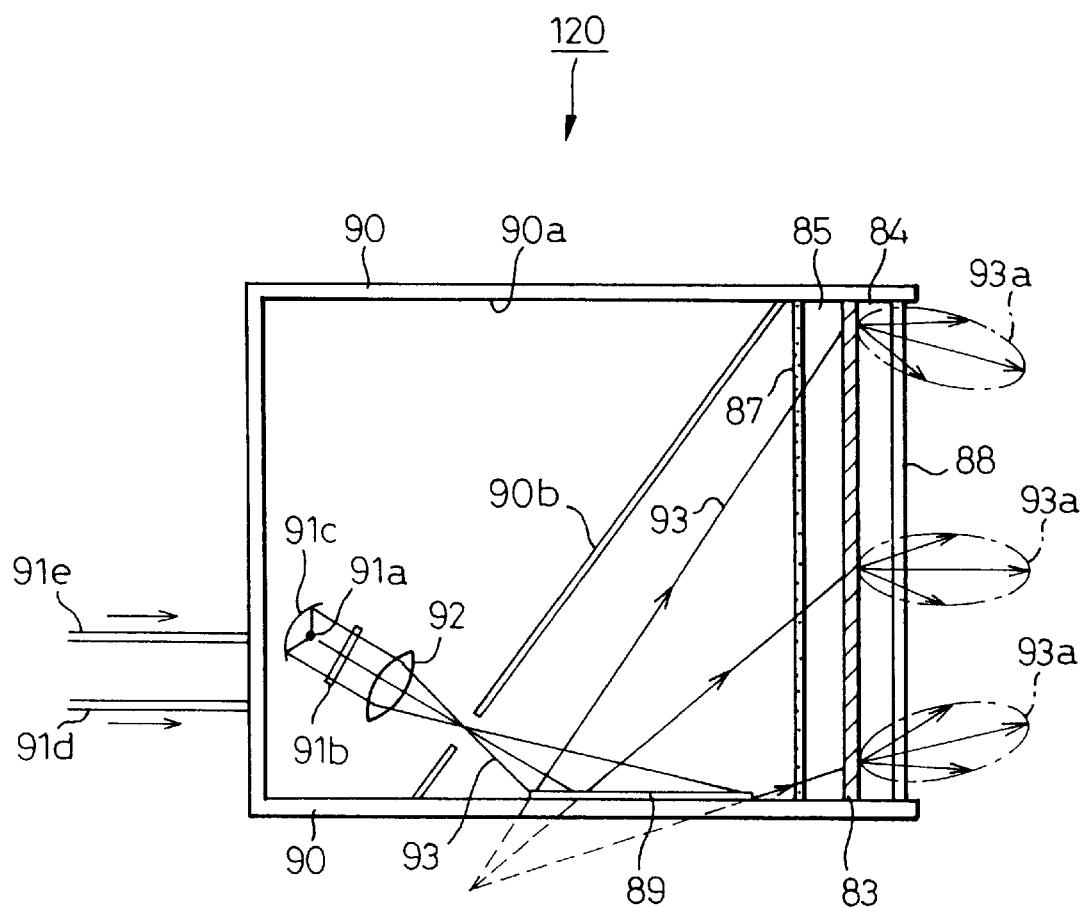
FIG. 34 shows another essential structure of the display device according to the present invention.
Figure 35:
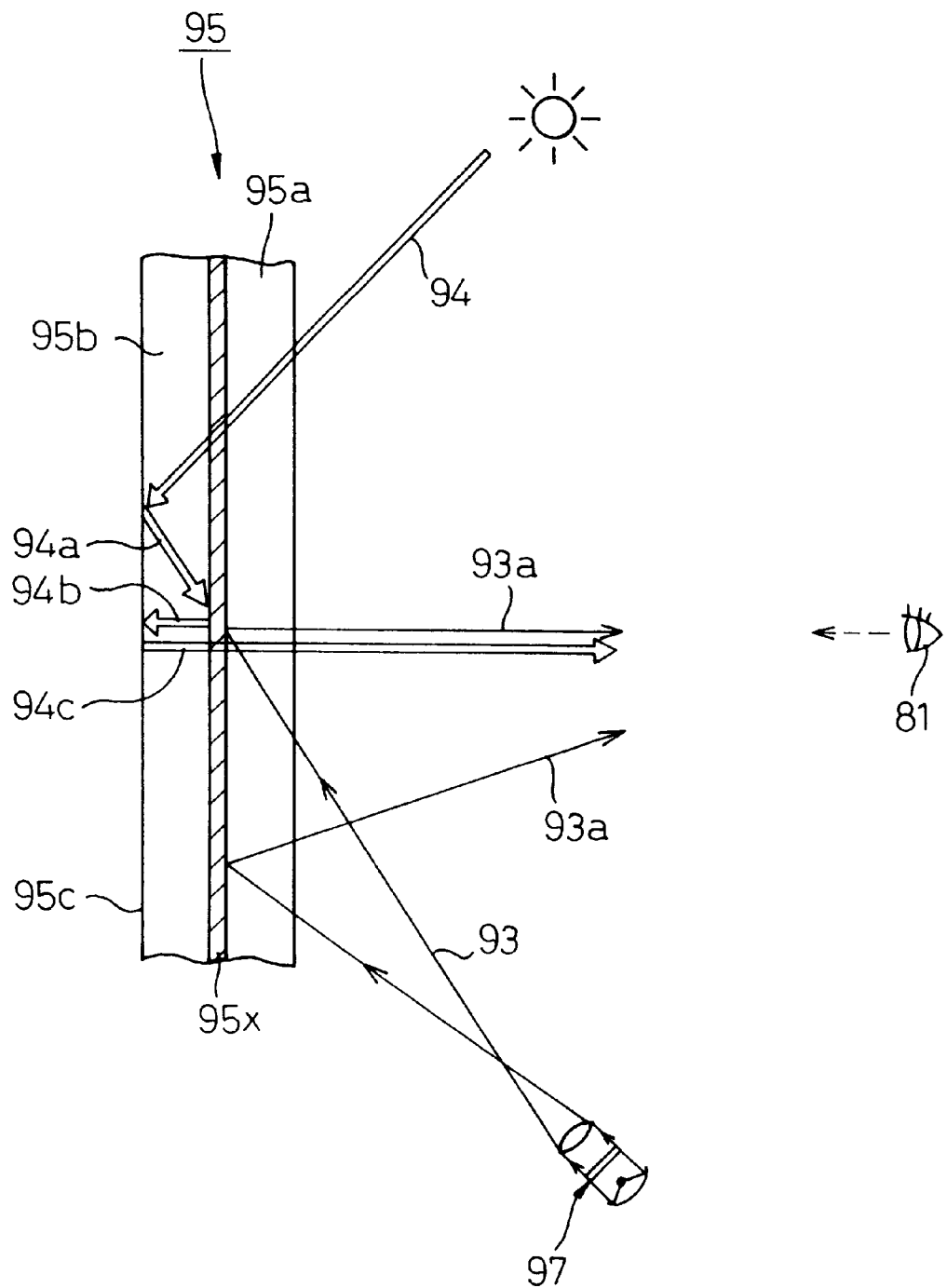
FIG. 35 is a view for explaining light paths of signal light and noise light in the reflection hologram.

As shown in FIG. 34, the display unit 120 is contained within a box 90. In this case, the dimensions of the box 90 are determined so as to become the same as those of the hologram plate 83. Accordingly, it is possible to pile up a plurality of the display devices to upper and lower (left and right) directions so as to form a large scale display device having a large screen.

Further, inner surfaces 90a and a barrier 90b in the box 90 are covered (coated) by a light absorbing material (for example, a back paint) so that it is possible to prevent external light incoming from the outside except for the front portion, and to suppress the noise reflected within the box 90.

As shown in the drawing, the display unit 91a to 91c and the image lens 92 are contained within the box 90, and the signal light 93 is irradiated to the hologram plate 83 from the same angle as shown in FIG. 32 in such a way that the zero-dimensional diffraction light does not enter the view-field of the observer 81. In order to realize this, a reflection mirror 89 is provided on the way of the light path between the image lens 92 and the hologram plate 83. In this drawing, 91d and 91e represent a power wire for supplying the power to the light source 91a and a signal wire for controlling the liquid crystal element 91b.

The following explanations are given to still another example of the display device.

Figure 37:
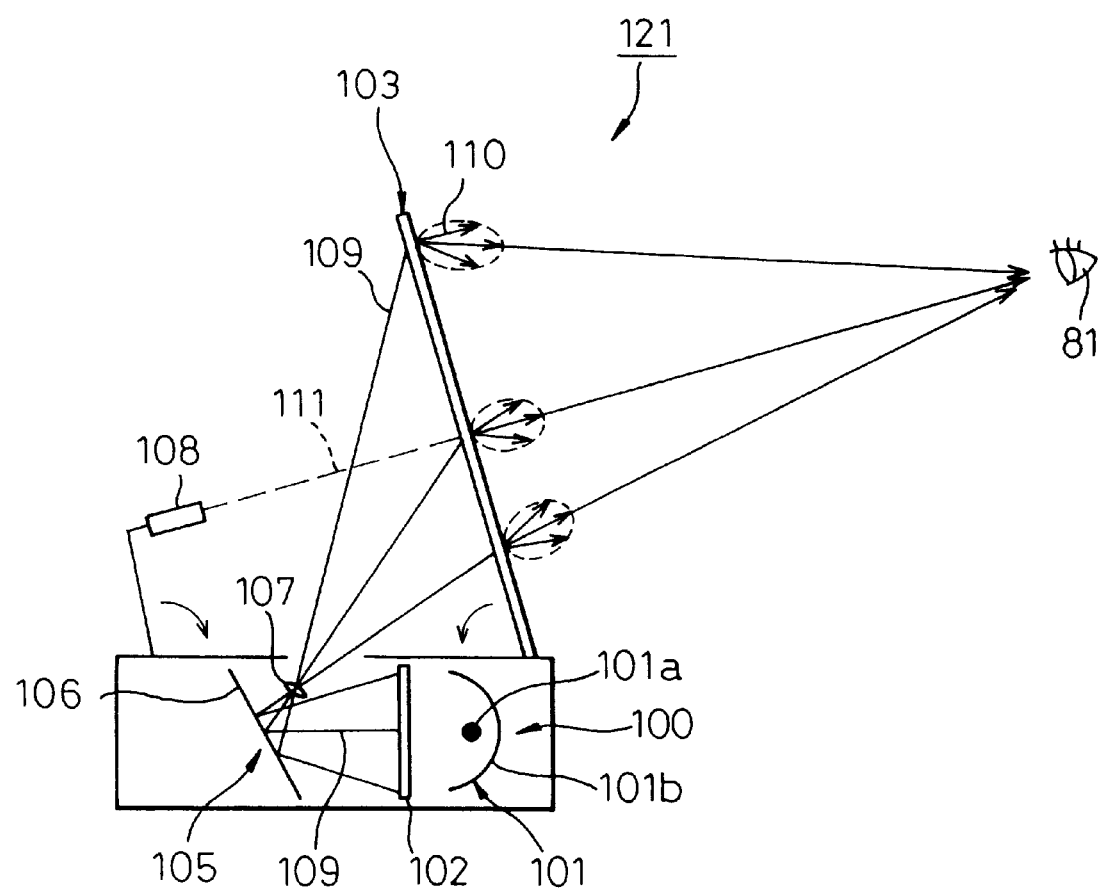
FIG. 37 shows an essential structure of another display device having a camera.

As shown in FIG. 37, the display device 121 includes a display unit 100 for generating the signal light 109 recording the image to be displayed; a transparent hologram screen 103; an optical system 105 for forming the image on the hologram screen 103; and a camera 108 for looking through the observer 81 from the rear side of the hologram screen 103 and for taking a picture of the observer 81. In this embodiment, the hologram screen is formed by the transmission hologram. Further, the line 111 connecting between the center portion of the camera 108 and the observer 81 approximately corresponds to the line connecting between the center of the hologram screen 103 and the observer 81.

The following explanations are given to structural elements of the display device.

The display unit 100 generating the signal light 109 consists of a backlight source 101 and a liquid crystal panel 102. 101a denotes the light source for the backlight, and 101b denotes the reflection plate. The light is irradiated from the rear side of the liquid crystal panel 102 so that the signal lights recording the image are generated the liquid crystal panel 102.

The signal light 109 is reflected by the mirror 106 which forms the image optical system 105, and the image is formed by the image lens 108 on the hologram screen 103. The diffusion plate is formed on the hologram screen 103 so that the diffused light 110 is diffused in the extent of the diffusion angle of the diffusion plate. Accordingly, the image can be observed by the observer 81 in the extent of the diffusion angle of the diffusion plate.

Further, the matching between the incident angle of the signal light 109 and the diffraction characteristic of the hologram is performed in such a way that the center angle of the diffused light 110 (i.e., the strongest direction of the intensity of the diffused light 110) is directed to the observer 81.

Further, the hologram screen 103 simply functions as the transparent plate for the lights except for the incoming direction of the signal light 109. Still further, a light receiving portion of the camera 108 which is arranged for the rear side of the hologram screen 103 is directed to the observer 81 so that it is possible to take the picture of the observer on the viewline of the observer by looking through the observer 81 from the rear side of the hologram screen 103.

Still further, the observer 81 can observe the background of the hologram screen 103. Since the luminance of the image is very large than the luminance of the background, it is possible to observe only the image on the screen if the observer is not careful.

In the present invention, since it is possible to easily coincide the direction 111 of the camera 108 with direction of the viewline of the observer 81, the viewline of the observer 81 coincides with the viewline of the other person who is displayed on the screen so that it is possible to have natural conversation without feeling of disorder.

Further, since it is not necessary to arrange the camera 108 in the front of the screen 103, a space necessary for the apparatus becomes small so that it is possible to eliminate a sense of oppression for the observer 81.

Still further, as the structural feature, the hologram screen 103 and the camera 108 can be inclined to the direction indicated by the arrow as shown in FIG. 37 so that it is possible to fold the display device when it is not used. Still further, it is possible to provide the camera within the case.

Figure 38:
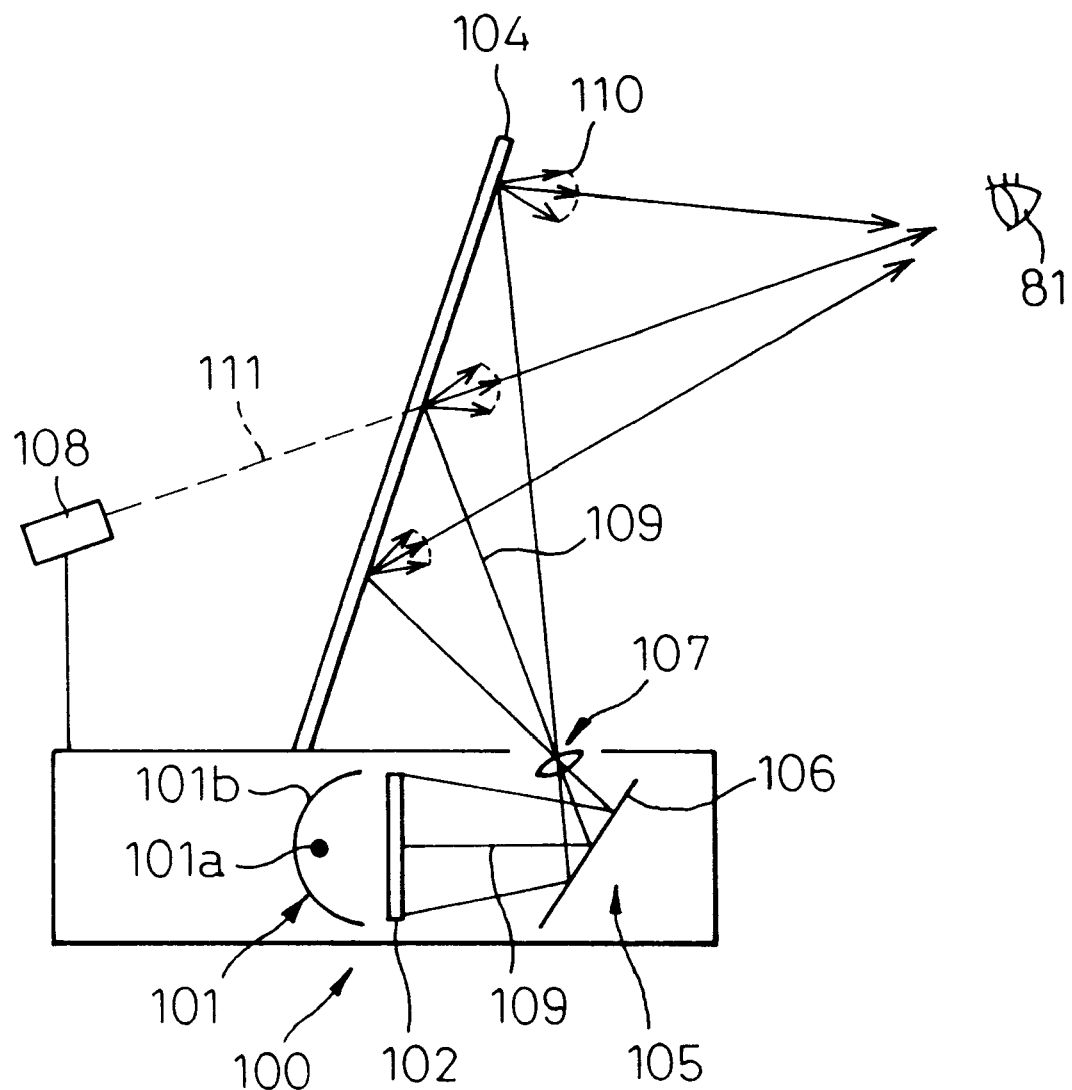
FIG. 38 shows an essential structure of still another display device having a camera.
Figure 39:
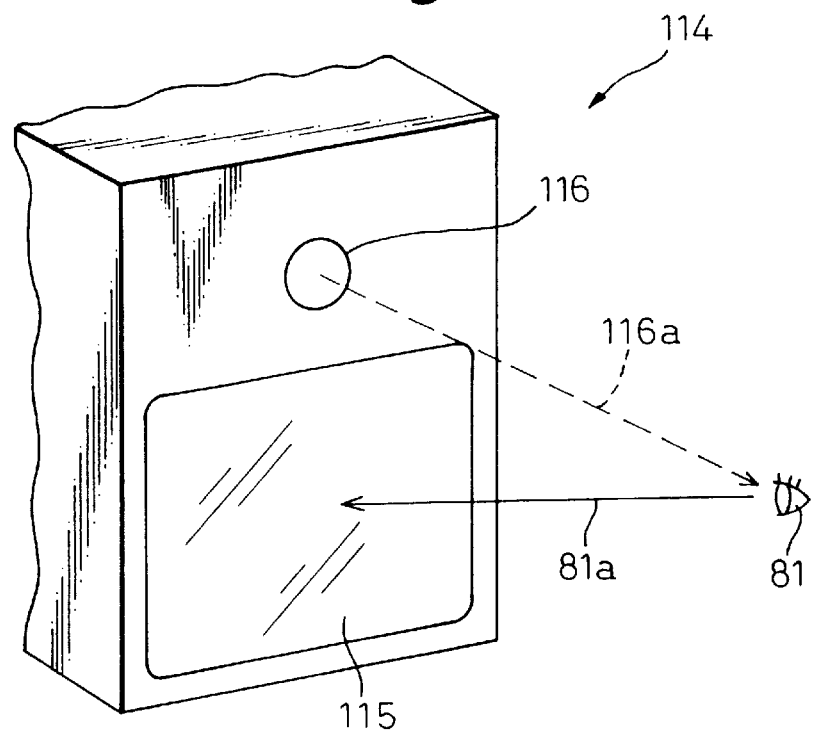
FIG. 39 and 40 show schematic structures of the display device having a camera in a conventional art.
Figure 40:
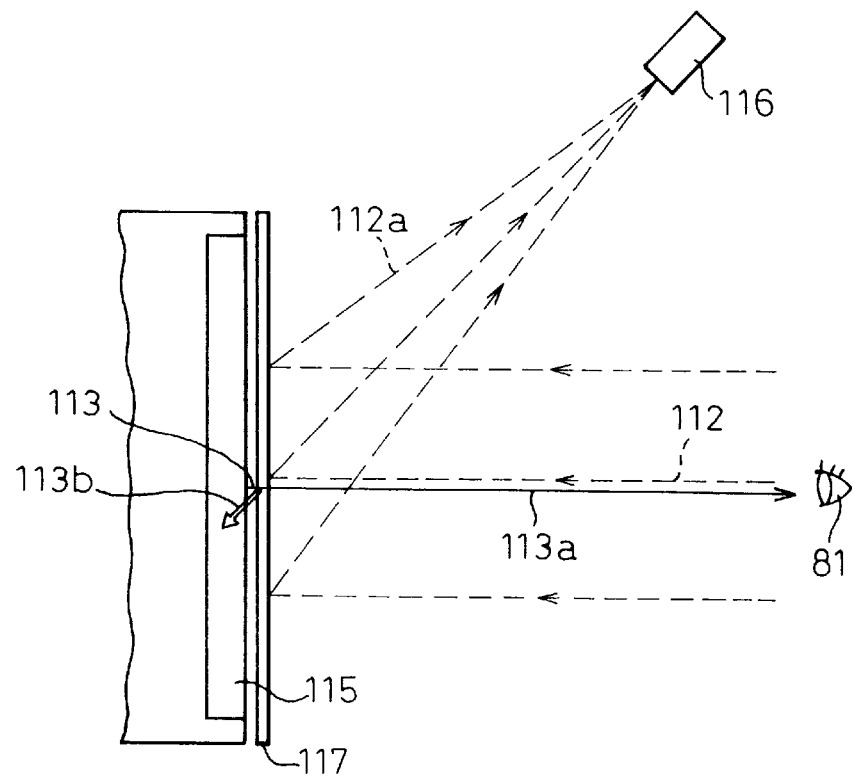

Still another embodiment is shown in FIG. 38. That is, the hologram screen 104 is formed by the reflection type. The signal light 109 is irradiated from the front side of the hologram screen 104, and the observer 81 observes the diffraction light (i.e., diffusion light 110) reflected by the hologram screen 104. Accordingly, the display device 100 and the image optical system 105 are arranged opposite to the arrangement of FIG. 37.

What is claimed is:

1. A method for producing a hologram by recording interference fringes formed by an object light and a reference light on a photosensitive dry plate, comprising:

providing a first object light and a second object light each of which is formed by said object light;

wherein said first object light passes through a transmission type optical diffusion body, and directly reaches said photosensitive dry plate; and wherein said second object light also passes through said transmission type optical diffusion body, and reaches said photosensitive dry plate after at least one reflection from a reflection mirror.

2. A method for producing a hologram as claimed in claim 1, wherein said reflection mirror is provided in an outer area surrounding said transmission type optical diffusion body.

3. A method for producing a hologram as claimed in claim 1, wherein said reflection mirror and said transmission type optical diffusion body are arranged so as to approximately intersect each other.

* * * * *